United States Patent
Ferguson

(10) Patent No.: US 12,443,314 B1
(45) Date of Patent: Oct. 14, 2025

(54) RESPONSE TO A TYPING INPUT

(71) Applicant: Cirque Corporation, Sandy, UT (US)

(72) Inventor: Daniel Ferguson, Herriman, UT (US)

(73) Assignee: Cirque Corporation, Sandy, UT (US)

(*) Notice: Subject to any disclaimer, the term of this patent is extended or adjusted under 35 U.S.C. 154(b) by 0 days.

(21) Appl. No.: 18/883,887

(22) Filed: Sep. 12, 2024

Related U.S. Application Data

(63) Continuation-in-part of application No. 18/809,924, filed on Aug. 20, 2024.

(51) Int. Cl.
*G06F 3/041* (2006.01)
*G06F 3/044* (2006.01)

(52) U.S. Cl.
CPC ........ *G06F 3/04186* (2019.05); *G06F 3/0446* (2019.05); *G06F 3/0445* (2019.05)

(58) Field of Classification Search
None
See application file for complete search history.

(56) References Cited

U.S. PATENT DOCUMENTS

| | | | |
|---|---|---|---|
| 8,604,364 B2 | 12/2013 | Simon | |
| 9,430,147 B2 | 8/2016 | Luo | |
| 11,449,123 B2 | 9/2022 | Li | |
| 11,836,317 B2 | 12/2023 | Yang | |
| 12,379,788 B2 * | 8/2025 | Autio | G06F 3/0231 |
| 2013/0201155 A1 | 8/2013 | Wu | |
| 2023/0110133 A1 | 4/2023 | Dhar | |

\* cited by examiner

*Primary Examiner* — Duane N Taylor, Jr.

(57) ABSTRACT

A capacitance module may include a set of electrodes, a controller in communication with the set of electrodes, and memory in communication with the processor. The memory may include programmed instructions that cause the controller, when executed, to receive a typing input; take a capacitance measurement in response to receiving the typing input; store an attribute associated with the capacitance measurement; and determine an input type of a subsequent user input over the set of electrodes based, at least in part, on the stored attribute.

19 Claims, 18 Drawing Sheets

RESPONSE TO A TYPING INPUT

CROSS REFERENCE TO RELATED APPLICATIONS

This application is a continuation-in-part of U.S. patent application Ser. No. 18/809,924 titled Determining an Unprompted Input filed on Aug. 20, 2024. U.S. patent application Ser. No. 18/809,924 is herein incorporated by reference for all that it discloses.

FIELD OF THE DISCLOSURE

This disclosure relates generally to systems and methods for enhancing touch input accuracy in capacitive touch devices. In particular, this disclosure relates to systems and methods for improving palm rejection and distinguishing between intentional and accidental touch inputs.

BACKGROUND

A touch pad is often incorporated into laptops and other devices to provide a mechanism for giving inputs to the device. One issue with capacitive touch input devices is the unintentional activation caused by accidental touches, particularly from the palm of the hand. This may occur when the device mistakenly interprets the palm resting on the touch surface as a deliberate input. Such accidental touches can lead to unintended actions, which can be frustrating for users and degrade the overall user experience.

Existing methods for palm rejection often rely on processes, such as ignoring large touch areas or inputs detected near the edges of the touch surface. While these methods can reduce the frequency of accidental touches, they are not always effective, especially in complex usage scenarios. Additionally, these approaches may fail to accurately differentiate between intentional and accidental touches, leading to either missed inputs or false activations.

An example of palm rejection is disclosed in U.S. Pat. No. 11,886,699 issued to Wayne Carl Westerman. The selective rejection of touch contacts in an edge region of a touch sensor panel is disclosed. In addition, by providing certain exceptions to the rejection of edge contacts, the functionality of the touch sensor panel can be maximized. Contacts in edge bands around the perimeter of a touch sensor panel can be ignored. However, if a contact in the edge band moves beyond a threshold distance or speed, it can be recognized as part of a gesture. To accommodate different finger sizes, the size of the edge band can be modified based on the identification of the finger or thumb. Furthermore, if contacts in the center region of a touch sensor panel track the movement of contacts in the edge band, the contacts in the edge band can be recognized as part of a gesture.

Another example of palm rejection is disclosed in U.S. Pat. No. 6,246,395 issued to Gregg S. Goyins, et al. This reference discloses a method and apparatus for categorizing substantially simultaneous inputs to a touchscreen. The method is described within a computer device having a display screen adapted to receive touchscreen input. In a first step, the display screen is divided into a plurality of sectors. Next, the sectors are sequentially scanned for input. When a plurality of substantially simultaneous inputs are sensed in respective sectors, the location by sector of each input is ascertained. A unique value is then assigned to each input received, the assigned values corresponding to the sequence in time of the respective inputs based upon the sequentially scanned sectors in which the inputs occurred. The apparatus includes a display screen adapted to receive touchscreen input. A touchscreen driver/sensor is provided to divide the display screen into a plurality of sectors and to sense input in each of the sectors. A sequence counter is used to actuate the driver/sensor to scan the display screen sectors sequentially and at predetermined intervals for input, and to assign a unique value to each input received.

An example of classifying touch type is disclosed in U.S. Pat. No. 11,175,698 issued to Christopher Harrison. This reference includes a method for sensing touch inputs to a digital equipment is provided, comprising the steps of sensing a sound/vibration signal generated by a touch, digitally processing the sensed sound/vibration signal, and determining the type of touch means that has generated the touch and the intensity of the touch based on the properties of the processed sound/vibration signal, wherein the properties include at least one of the following properties of the sound/vibration signal in time domain: maximum amplitude, average amplitude, average frequency, mean, standard deviation, standard deviation normalized by overall amplitude, variance, skewness, kurtosis, sum, absolute sum, root mean square (RMS), crest factor, dispersion, entropy, power sum, center of mass, coefficients of variation, cross correlation, zero-crossings, seasonality, DC bias, or the above properties computed for the first, second, third or higher order of derivatives of the sound/vibration signal; and the following properties of the sound/vibration signal in frequency domain: spectral centroid, spectral density, spherical harmonics, total average spectral energy, band energy ratios for every octave, log spectral band ratios, linear prediction-based cepstral coefficients (LPCCs), perceptual linear prediction (PLP) cepstral coefficients, mel-frequency cepstral coefficients, frequency topology, or the above properties computed for the first, second, third or higher order of derivatives of a frequency domain representation of the sound/vibration signal. There is also provided a device for sensing touch inputs.

Each of these references are herein incorporated by reference for all that they disclose.

SUMMARY

A capacitance module may include a set of electrodes; a controller in communication with the set of electrodes; and memory in communication with the processor. The memory may include programmed instructions that cause the controller, when executed, to receive a typing input; take a capacitance measurement in response to receiving the typing input; store an attribute associated with the capacitance measurement; and determine an input type of a subsequent user input over the set of electrodes based, at least in part, on the stored attribute.

The programmed instructions may further cause the controller, when executed, to obtain a subsequent attribute from a subsequent input detected over the set of electrodes; compare the subsequent attribute with the stored attribute; and determine that the subsequent input may be a palm input based on the comparison of the subsequent attribute with the stored attribute.

The programmed instructions may further cause the controller, when executed, to ignore the subsequent input in response to the determination that the subsequent input is a palm input.

The programmed instructions may further cause the controller, when executed, to cancel the subsequent input in response to the determination that the subsequent input is a palm input.

The programmed instructions may further cause the controller, when executed, to disable at least a portion of the capacitance sensor in response to the determination that the subsequent input is a palm input.

The programmed instructions may further cause the controller, when executed, to obtain a subsequent attribute from a subsequent input detected over the set of electrodes; compare the subsequent attribute with the stored attribute; and determine that the subsequent input may be a finger input based on the comparison of the subsequent attribute with the stored attribute.

The input type may be a finger input.

The input type may be a palm input.

The input type may be a proximity input.

The typing input may be from a keyboard in communication with the controller.

The typing input may be from a virtual key positioned in proximity to the set of electrodes in communication with the controller.

The attribute may be a capacitance image length.

The attribute may be a capacitance image width.

The attribute may be a capacitance image surface area.

The attribute may be a capacitance signal strength.

The attribute may be a capacitance image shape.

The attribute may be a capacitance image movement direction.

The attribute may be a capacitance image movement pattern.

The program instructions may further cause the controller, when executed, to receive a second typing input; take a second capacitance measurement in response to receiving the second typing input; determine a second attribute of the second capacitance measurement; and modify the stored attribute based at least in part on the second attribute.

A method for determining an input type on a capacitance module may include receiving a typing input; taking a capacitance measurement in response to receiving the typing input; storing an attribute associated with the capacitance measurement; and determining an input type of a subsequent user input over the set of electrodes based, at least in part, on the stored attribute.

A computer-program product for determining a user input on a capacitance module; the computer-program product may include a non-transitory computer-readable medium storing instructions executable by a controller to receive a typing input; take a capacitance measurement in response to receiving the typing input; store an attribute associated with the capacitance measurement; and determine an input type of a subsequent user input over the set of electrodes based, at least in part, on the stored attribute.

Figure 1:
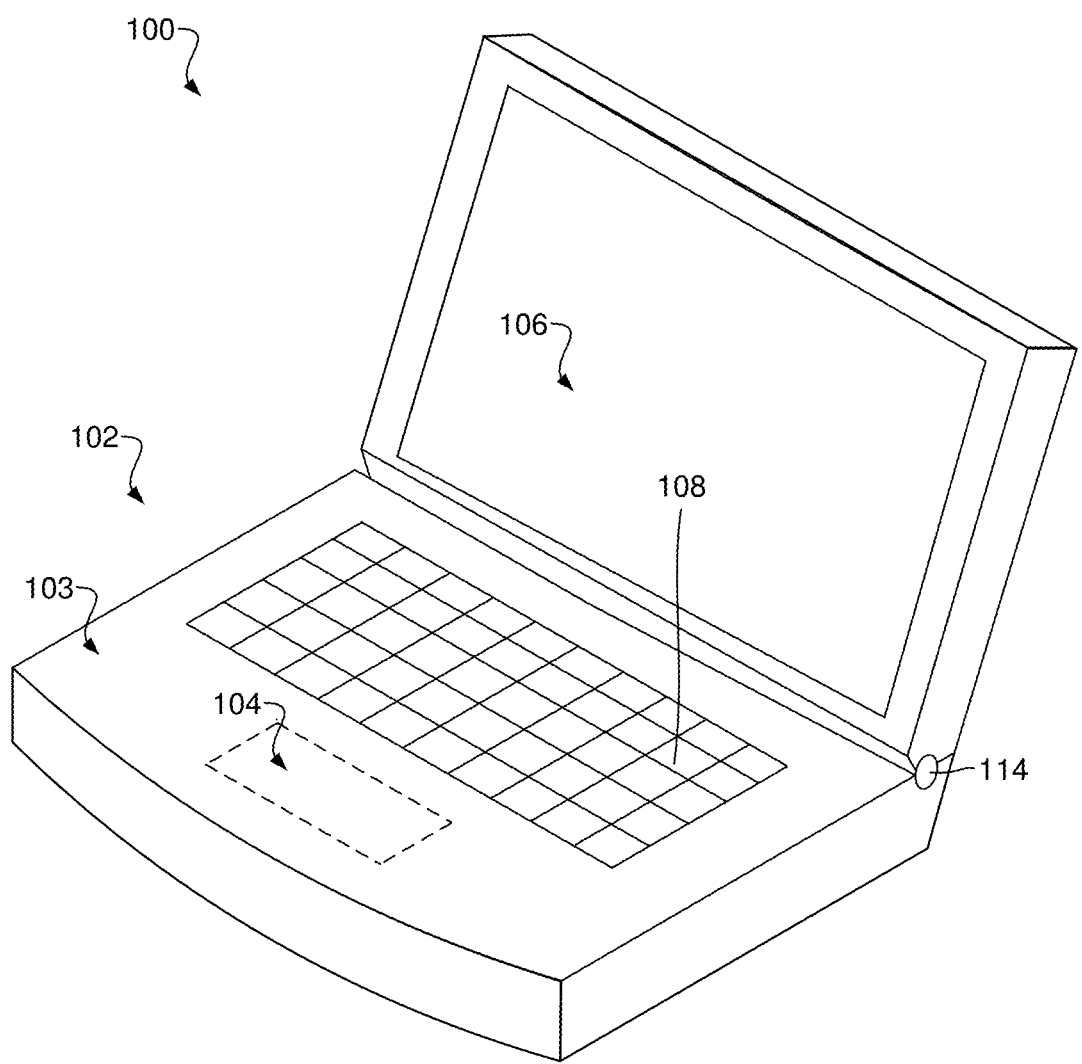
FIG. 1 depicts an example of an electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability, or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, a stud finder, an automation device, a security device, a display, a computer mouse, a vehicle, an infotainment system, an audio system, a control panel, another type of device, an athletic tracking device, a tracking device, a card reader, a purchasing station, a kiosk, a button, a slider, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen." The capacitance module may be incorporated into an electronic device.

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

For the purposes of this disclosure, the term "dimension attribute" may generally refer to a dimension of the object (e.g., finger, thumb, palm, stylus, etc.) being measured. In some examples, a dimension attribute may include a length, a width, a surface area, a distance between features of the object, a diagonal measurement of an object, a diagonal measurement of a feature of an object, a curvature of an edge of the object, a length of an edge of the object, a cross section of the object, a cross section of a portion of the object, a cross section of a feature of an object, a length of a feature of an object, a length of a central axis of the object, an angular orientation of a central axis of the object, a location of a central axis of a feature of the object, an angular orientation of a feature of the object, another dimension, or combinations thereof. A feature of an object may include a protuberance of an object, a discontinuity of an object, an appendage of an object, another feature, or combinations thereof. A dimension attribute may be a finger dimension attribute, a thumb dimension attribute, a palm dimension attribute, a stylus dimension attribute, a proximity dimension attribute, another type of dimension attribute, or combinations thereof.

For the purposes of this disclosure, the term "movement attribute" may generally refer to a movement of the object (e.g., finger, thumb, palm, stylus, etc.) being measured. In some examples, a dimension attribute may include a distance traveled by the object, a rotation of the object, an angular distance of the object rotated, a nutation of the object, a movement direction of the object, a pattern of movement of the object, a speed of movement of the object, an initial speed of movement of the object, a continuing speed (i.e., a speed after the initial speed) of the object, a scrolling pattern of the object, a duration of movement of the object, a number of cycles of movement of the object within a predetermined time period, a swiping stroke distance, a swiping speed, a swiping angle, a number of swipes, a swiping rotation, a wiggle of the object, a wiggle variation in the object, a stability of the object, a static position of the object, a duration of a static position of the object, a scrolling stroke distance, a scrolling speed, a scrolling angle, a number of scrolling cycles, a scrolling rotation, a curvature of movement, a trajectory of movement, a location of the movement, a zoom stroke distance, a zoom in speed, a zoom out speed, a zoom pinch angle, a number of zoom cycles, a zoom pinch rotation, a curvature of movement of a zoom, a trajectory of a zoom movement, a location of a zoom movement, a difference in speeds between different parts of the object, a difference in angular speeds between different parts of the object, a difference in rotations between different parts of the object, a distal speed of an object, a proximal speed of an object, a rotational velocity of an object, a shape formed by movement of the object, the straightness of a line formed by the movement, a change in length of the object, a change in width of the object, a change in rotation of the object, a change in surface area of the object, a change in a dimension of the object, a change in a shape of the object, a change in a curvature of an edge of the object, a change in central axis position of the object, a change in central axis position of a feature of the object, a change in orientation of the object or feature, a frequency of change in position of the object or feature, a frequency of movement of the object or feature, a change in relative angular position of between features of the object, a change in relative angular position of between central axes of features of the object, another type of movement attribute, or combinations thereof. A movement attribute may be a finger movement attribute, a thumb movement attribute, a palm movement attribute, a stylus movement attribute, a proximity movement attribute, a differential of movement between different parts of an object, a relative movement, an absolute movement, another type of movement attribute, an acceleration attribute, or combinations thereof.

For the purposes of this disclosure, the term "signal attribute" may generally refer to a signal of the capacitance measurement. In some examples, a signal attribute may include a signal strength, a signal duration, a signal amplitude, noise associated with the signal, a pattern of noise accompanying the signal, an interference of the signal, an interference pattern associated with the signal, a resonance of the signal, the frequency of the signal, a polarity of the signal, a reflection of the signal, a voltage of the signal, a change in signal strength of the signal over time, a change in frequency of the signal over time, a change in amplitude of the signal over time, a change in polarity of the signal over time, another change of the signal over time, a peak of the signal, an edge of the signal, a processed signal attribute, an analog signal attribute, another signal attribute, or combinations thereof.

For the purposes of this disclosure, the term "image attribute" may generally refer to an image of the object (e.g., finger, thumb, palm, stylus, etc.) being measured. In some examples, an image attribute may include an image length, an image width, an image surface area, a distance between features of the image, an interpolation of the image, a spline of the image, a shape of the spline, a curvature of the spline, a number of knots in the spline, a relative angle between different portions of a spline, a distance between knots of a spline, an image edge attribute, a centroid of the image, a distance between an image edge and an image centroid, a change in signal strength across an image, a location of an edge, a location of a corner of an image, a length of a linear portion of an edge of the image, a location of a linear portion of the edge of the image, a symmetry of an image, an asymmetry of an image, a dimension of an asymmetry of an image, a repeated pattern in the image, a dimension of a segmentation of the image, an image outline, a portion of an image outline, a derivative of an image outline or a portion of an image outline, a number of identification of features of interest in an image, a spacing pattern of features of an image, a spacing distance of features of an image, a density of an image, another image attribute, or combinations thereof.

For the purposes of this disclosure, the term "typing prompt" may generally refer to a prompt to press one or more keys associated with the electronic device that incorporates the capacitance module. In some examples, the key is a slider, a mechanical switch key, a virtual key, a key incorporated into a touch pad, a key incorporated into a touch screen, a key incorporated into a touch surface, or combinations thereof. The prompt may include a request to press or hover over a specific key, a single key, multiple keys at the same time, multiple keys in a specific sequence, or combinations thereof. The prompt may include requesting that a user type a specific alphanumeric letter, type a specific word or phrase, type a specific code, or combinations thereof. The prompt may include a request to type a sequence of keys that typically involves using two hands to type, using a single hand to type, typing on a right-hand side of a keyboard, typing on a left-hand side of a keyboard, typing in a central region of a keyboard, or combinations thereof.

For the purposes of this disclosure, the term "typing attribute" may generally refer to a dimension attribute, a movement attribute, a signal attribute, an image attribute, a proximity attribute, processed attribute, a raw data attribute, another type of attribute, or combinations thereof. In some cases, a typing prompt may cause a user to bring his or her hands, palms, thumbs, and/or near to a capacitance sensor. In such an example, the system may recognize a combination of palm, fingers, and thumbs that may hover over a capacitance reference surface, may rest on a capacitance reference surface, may touch a capacitance reference surface, may be to the side of a capacitance reference surface, or combinations thereof. The act of typing may also cause multiple movements in the fingers, thumbs, and palms that occur simultaneously or during overlapping time periods. Thus, the typing attribute may include aspects of attributes from the finger, thumbs, and palms.

For the purposes of this disclosure, the term "finger input" may generally refer to touching a reference surface of the input device with a finger and/or hovering over the input device with a finger. Stored attributes associated with the finger attribute may include a signal strength, multiple capacitance signal strengths at select locations corresponding to a finger shape, a finger length, a finger width, multiple finger widths along the length of the finger, a finger shape, a surface area associated with the finger, a finger size, another dimension of the finger shape, dimension attributes associated with the finger, movement attributes associated with a finger, signal attributes associated with a finger, image attributes associated with a finger, another attribute associated with the finger input, or combinations thereof.

For the purposes of this disclosure, the term "palm input" may generally refer to touching a reference surface of the input device with a palm of the user's hand or hovering a palm over the input device. A stored attribute associated with a palm input may include capacitance signal strength, multiple capacitance signal strengths at select locations corresponding to a palm shape, a palm length, a palm width, multiple palm widths along the length of the palm, multiple palm lengths along the width of the palm, a palm shape, a surface area associated with the palm, a palm size, a location of one or more fingers and/or thumbs protruding from the palm, another dimension of the palm shape, dimension attributes associated with the palm, movement attributes associated with a palm, signal attributes associated with a palm, image attributes associated with a palm, another attribute associated with the palm input, or combinations thereof.

For the purposes of this disclosure, the term "thumb input" may generally refer to touching a reference surface of the input device with a thumb and/or hovering a thumb over the input device. A thumb input may include a capacitance signal strength, multiple capacitance signal strengths at select locations corresponding to a thumb shape, a thumb length, a thumb width, multiple thumb widths along the length of the thumb, a thumb shape, a surface area associated with the thumb, a thumb size, another dimension of the thumb shape, dimension attributes associated with the thumb, movement attributes associated with a thumb, signal attributes associated with a thumb, image attributes associated with a thumb, another attribute associated with the thumb input, or combinations thereof.

For the purposes of this disclosure, the term "proximity input" may generally refer to hovering a detectable object over a reference surface of the input device. For example, a proximity thumb input may include hovering a thumb over the reference surface of the input device without touching the input device. For example, a proximity palm input may include hovering a palm over the reference surface of the input device without touching the input device. For example, a proximity finger input may include hovering a finger over the reference surface of the input device without touching the input device.

For the purposes of this disclosure, the term "signal attribute" may generally refer to a capacitance signal strength, multiple capacitance signal strengths at select locations corresponding to an input proximate shape, a proximate shape length, a proximate shape width, multiple widths along the length of the proximate shape, a proximate shape, a surface area associated with the proximate shape, a proximate shape size, dimension attributes associated with the proximate object, movement attributes associated with a proximate object, signal attributes associated with a proximate object, image attributes associated with a proximate object, another attribute associated with the proximate input, or combinations thereof.

In some cases, the raw data from the inputs may be stored as the attributes. In other examples, the attributes may include processed data. In some examples, the processed attributes may include average lengths, median lengths, maximum lengths, minimum lengths, lengths within the first standard of deviation, average widths, median widths, maximum widths, minimum widths, widths within the first standard of deviation, average surface areas, median surface areas, maximum surface areas, minimum surface areas, surface areas within the first standard of deviation, average capacitance signal strengths, median capacitance signal strengths, maximum capacitance signal strengths, minimum capacitance signal strengths, capacitance signal strengths within the first standard of deviation, average sizes, median capacitance signal strengths, maximum sizes, minimum sizes, sizes within the first standard of deviation, other processed attributes, or combinations therefore. In some cases, both raw and processed attributes are stored and/or used to compare against the unprompted user inputs.

In some cases where the capacitance reference surface is distinctly different than the keyboard and are spaced at a distance apart from each other, a typing attribute may be associated with an unintentional user input assuming that the user is typing and not intending to provide a touch or proximity user input through the capacitance sensor. In other examples, such as where the keys are incorporated into a capacitance reference surface, the system may determine that the type inputs are intentional, but that the palm inputs are unintentional. In such a situation, the system may distinguish between which of the inputs are intentional and which of the inputs are unintentional. In such a situation, there may be some inputs that are intentional and unintentional provided into the system at the same time or during overlapping times.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by depositing at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approaches the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
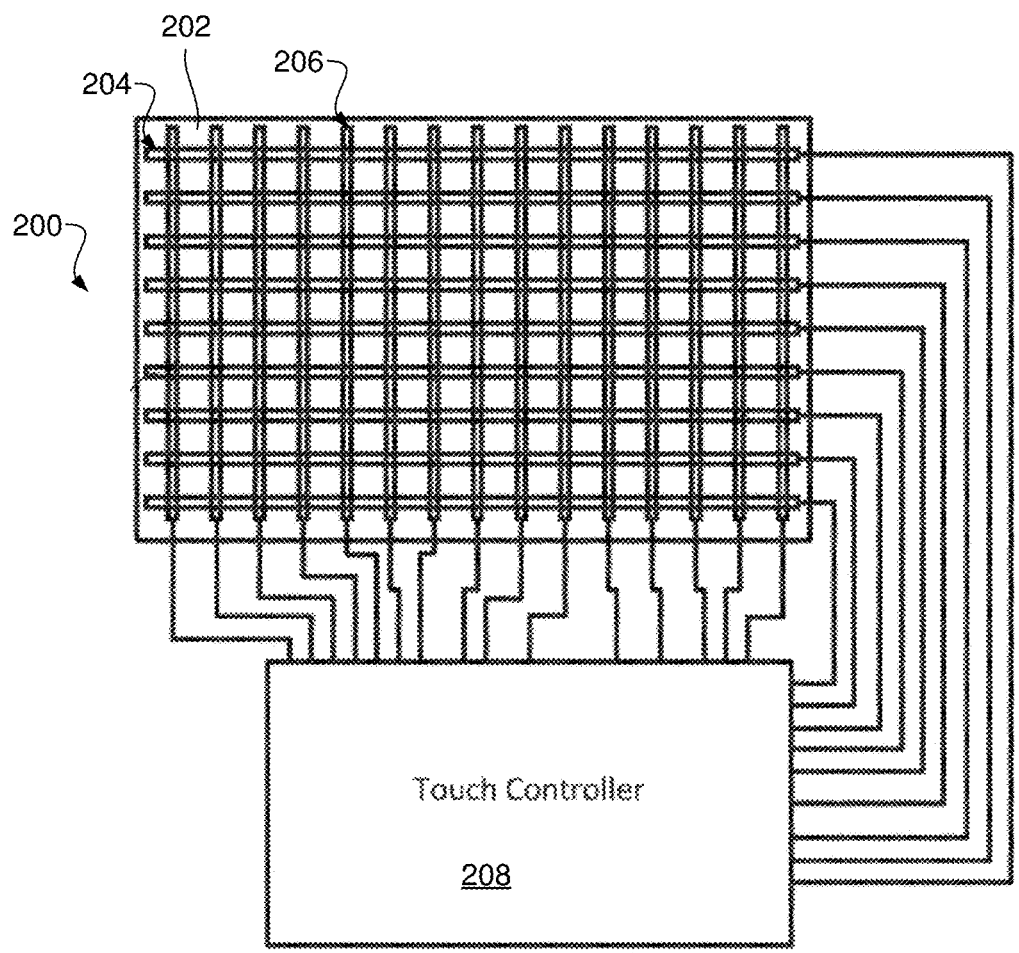
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
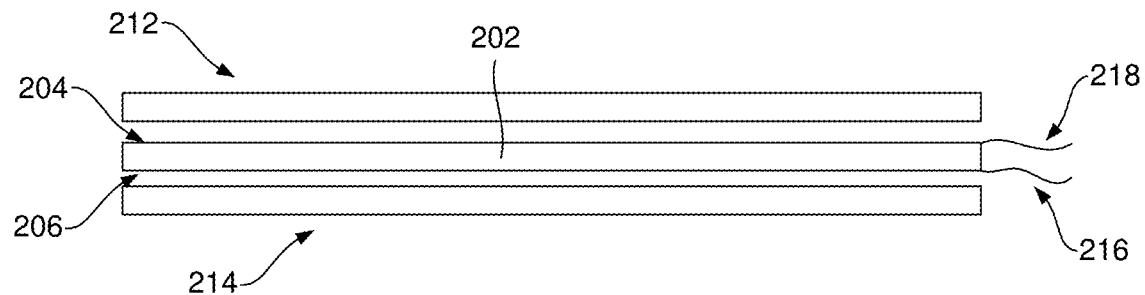
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approaches the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
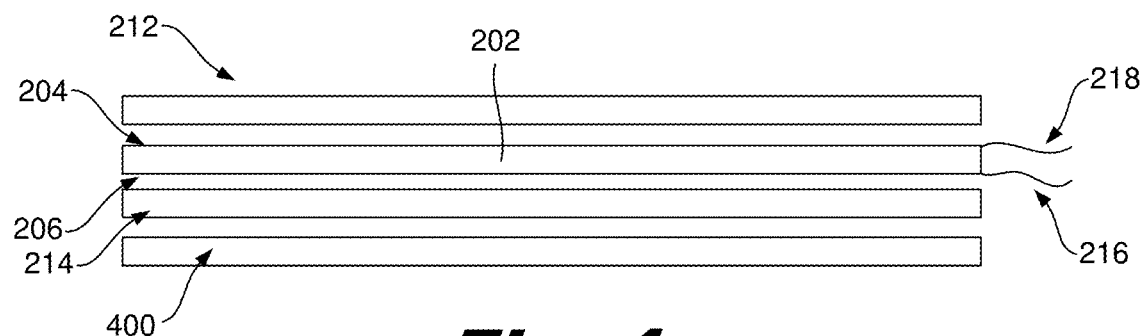
FIG. 4 depicts an example of a touch screen in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5:
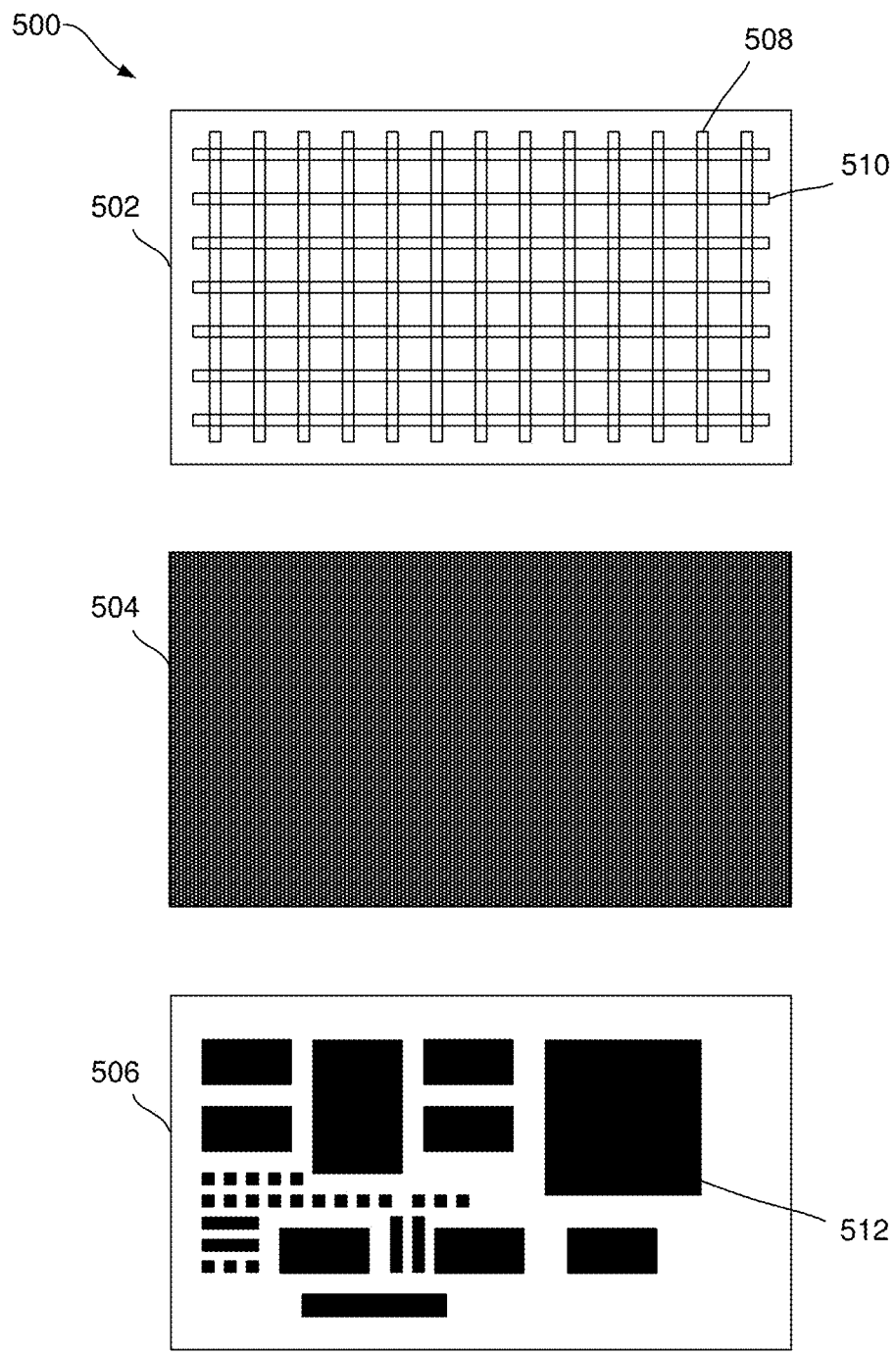
FIG. 5 depicts an example of a capacitance module in accordance with the disclosure.

FIG. 5 depicts an example of a capacitance module 500. In this example, the capacitance module 500 is a stack of three layers, including a sensor layer 502, a shield layer 504, and a component layer 506. While the capacitance module 500 in this example includes three layers, in other examples, a capacitance module may include a different number of layers. For example, a capacitance module may include four layers, five layers, or a different number of layers.

The sensor layer 502 may include a first set 508 of electrodes and a second set 510 of electrodes which may be used in a capacitance circuit to detect and/or measure changes in capacitance. While this example depicts a sensor layer 502 with two sets of electrodes, in other examples, a sensor layer may include one set of electrodes, three sets of electrodes, or a different number of sets of electrodes. While this example depicts a single sensor layer 502, in other examples a capacitance module may include more than one sensor layer.

The first set 508 of electrodes and the second set 510 of electrodes may operate using mutual capacitance, self-capacitance, or combinations thereof. In examples where a sensor layer includes a single set of electrodes, the single set of electrodes may operate using self-capacitance. In other examples, the first and second sets of electrodes are located on different layers.

The shield layer 504 is located adjacent to the sensor layer 502 within the capacitance module 500. In other examples, a shield layer may be in another location relative to other layers in the stack.

The shield layer 504 may include a material which blocks or reduces electromagnetic and/or electrical interference. In some examples, a shield layer may be made of a conductive material such as copper, aluminum, silver, or combinations thereof. In other examples, a shield layer may be a composite material such as plastic, glass, another composite structure, or combinations thereof. In yet other examples, a shield layer may be a shielding material coating applied to a substrate, such as indium tin oxide (ITO), graphene, a conductive polymer, another coating, or combinations thereof. In some cases, a shield layer's material may be a magnetic material, such as iron, ferrite, another metal, composites thereof, alloys thereof, mixtures thereof, or combinations thereof.

In this example, the shield layer 504 is located between the sensor layer 502 and the component layer 506. The shield layer 504 may help prevent electromagnetic interference originating from components 518 on the component layer 506 or sources external to the capacitance module from interfering with the first set 508 and/or second set 510 of electrodes on the sensor layer 502.

Shielding the sensor layer 502 with the shield layer 504 may improve the accuracy and stability of capacitance measurements measured by first set 508 and second set 501 of electrodes. Shielding the sensor layer 502 may also reduce noise, which may increase the sensitivity and accuracy of user inputs on the capacitance module 500. The shield layer 504 may be positioned to block interference from a battery, power sources, memory resources, processing resources, electronic components, other components, or combinations thereof that may be positioned within a cavity of the electronic device.

In this example, the component layer 506 is adjacent to the shield layer 504. In other examples, a component layer may be in another location relative to other layers in a stack or parts of a capacitance module. The component layer 506 includes components 512.

The component layer 506 may include components 512 which facilitate the functionality of the capacitance module 500. Components on a component layer may include a central processing unit (CPU), a microcontroller, an op-amp, a memory unit, a field-programmable gate array (FPGA), a graphics processing unit (GPU), an interface controller, a power management integrated circuit, processing resources, an antenna, another type of component, or combinations thereof.

Figure 6:
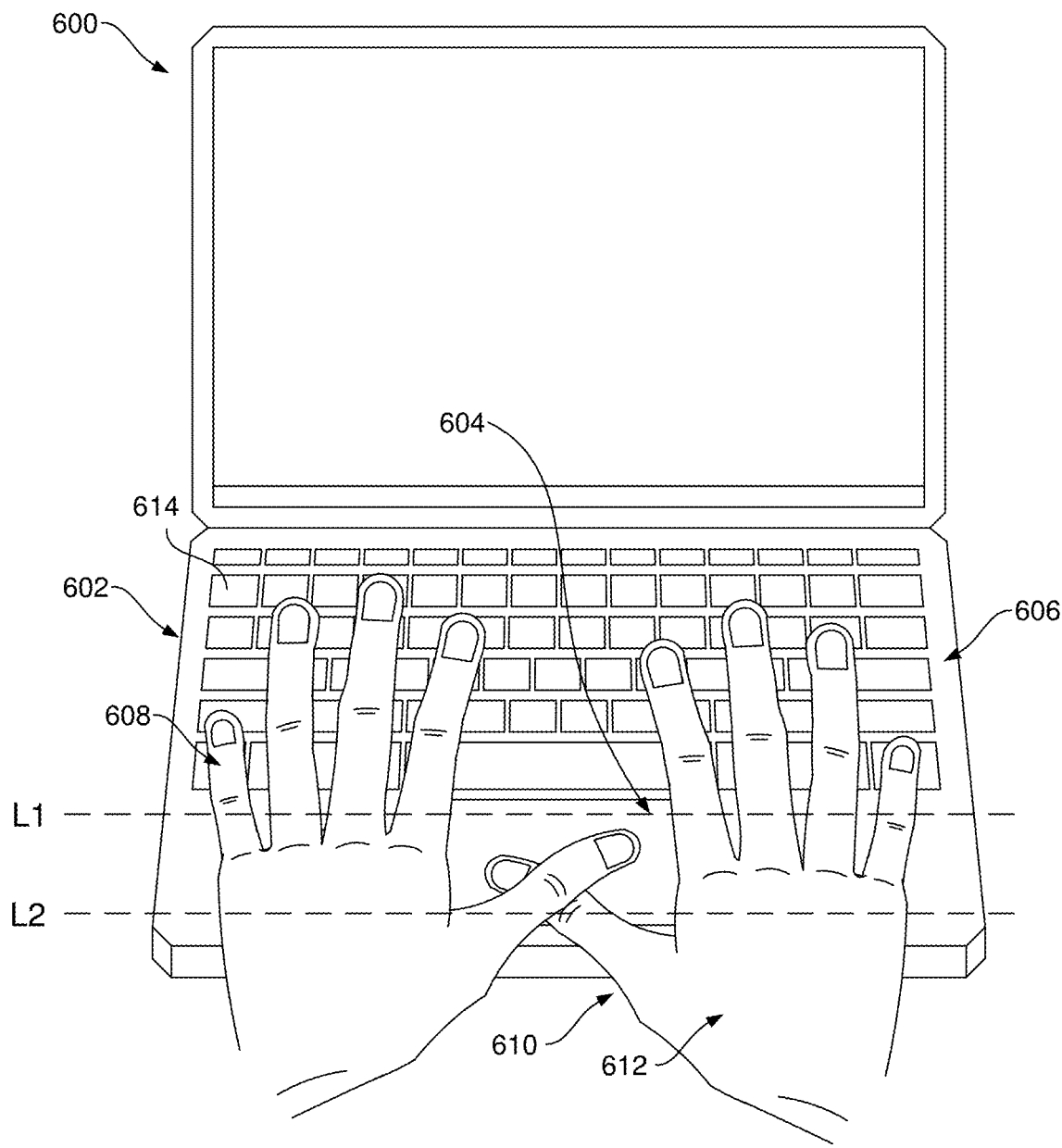
FIG. 6 depicts an example of providing a user input in accordance with the disclosure.

FIG. 6 depicts an example of providing a typing input in accordance with the disclosure. In this example, a user is providing a typing input into an electronic device 600 that has a mechanical switch keyboard 602 that is separate and spaced apart from a touch pad 604. The touch pad 604 is an input device that includes the capacitance module that senses when a user touches the surface of the touch pad as well as a proximity measurement when the user's hand 606, finger 608, thumb 610, and/or palm 612 is hovering over the surface of the touch pad but does not make contact with the touch pad's surface.

In some examples, when the user selects a key 614 on the keyboard 602, a message is sent to the capacitance module's controller. The message may be sent in response to selecting a specific key or to typing a specific word or phrase. In some cases, a message is sent in response if any key is selected. The message may be sent every time that any key is selected, a specific key is selected, or a specific word or phrase is typed. In other examples, there may be a predetermined waiting period between sending a first message in response to the typing input and a second message in response to a type input. In yet other examples, the message may be used after a number of predetermined number of inputs. For example, the message may be sent in response to every tenth time that a key is selected, a specific word is typed, or a specific phrase is typed.

The message may indicate that the keyboard is being used. In some cases, the message just indicates that the keyboard is being used in general. In other examples, the specific key selected is communicated to the controller. In some cases, the specific phrase is communicated to the controller.

Upon receiving the typing input, the controller may cause the capacitance module take a measurement. The measurement may reflect the capacitance signal of the portion of the user's hands that directly over or near the touch pad. In some cases, a portion of the user's hands that are directly over the keyboard 602, instead of the touch pad, are not reflected in the measurement. The measurement may include data that includes the capacitance signal strength at various locations of the touch pad. The measurement's data may be used to construct an image of the user's hand and/or finger(s).

At least one attribute from the raw data of the measurement or processed data derived from the raw data may be collected and stored. The stored attributes may include dimension attributes, movement attributes, signal attributes, image attributes, raw data attributes, processed data attributes, another type of attribute, or combinations thereof.

The first time that a measurement is taken, the stored attributes may be baseline attributes. In some cases, when an object is detected over the set of electrodes of the capacitance module, object attributes may be derived from the measurement taken when the object is detected. These object attributes may be compared to the baseline attributes. In some cases, if the baseline attributes match the object attributes, then the system may determine that the user is typing on the keyboard. In some cases, if the object attributes are similar to the baseline attributes, then the system may determine that the user is typing on the keyboard.

In some cases, during subsequent typing inputs, subsequent typing measurements with the capacitance module may be taken. Subsequent typing attributes may be obtained based at least in part on the subsequent typing measurements. The subsequent typing attributes may be used to refine the stored attributes resulting in at least one refined stored attribute. In some cases, the object attributes are compared to the refined attributes. In those cases, where the object attribute matches or is similar to the refined stored attributes, the system may determine that the user is typing with the keyboard, making an unintentional input, experiencing a false positive, making a palm input, or making another specific user input, or combinations thereof. In other examples, if the object attribute is within one standard deviation of the refined stored attribute, the system may determine that the user is typing with the keyboard, making an unintentional input, experiencing a false positive, making a palm input, or making another specific user input, or combinations thereof.

In some cases, the system may determine that when the user is typing that the signals measured with the capacitance sensor are palm inputs, palm touch inputs, palm proximity inputs, partial palm inputs, or combinations thereof. In such cases, the system may determine that the attributes obtained while the user is typing are reflective of unintentional input. These inputs may occur for example when the user rests the palm of his or her hand on a portion of the touch pad while typing, or while a portion of the user's palm is hovering over a portion of the touch pad while typing. As a result, the system may associate one or more of the stored attributes with unintentional user inputs. In response, the system may cancel the subsequent user inputs over the touch pad, ignore the subsequent user inputs, disable at least a portion of the touch pad, execute another response, or combinations thereof.

For example, different users have different hand, finger, thumb, and palm sizes. A user providing an intentional input with a large finger or thumb near an edge of the touch pad may appear to be a portion of another user's palm from a capacitance signal strength perspective and/or a dimensional perspective. As such it may be difficult to provide a controller with a manufacturer's baseline dimensions and finger characteristics that are appropriate for distinguishing between one user's palm and another user's finger used at an edge of a touch pad. However, when both users are typing, they may often place his or her hands near the edge in a way that is unique to them. For example, a user may place their palms directly on top of and make contact with a portion of the touch pad, hold their palms over the touch pad, move their thumbs in a unique manner, move their fingers while typing in a unique way, or combinations thereof. The user's unique hand placement, unique hand movement, unique sizes, and unique shapes may all be used to identify attributes that can be associated with the user's typing patterns and or touch patterns.

In some examples, at least one of the stored attributes may be associated with a location of the capacitance module and/or touch pad. In the depicted figure, a first horizontal location is marked with first dashed line L1 and a second horizontal location is marked with a second dashed line L2. In the depicted example, the base of the user's fingers are hovering over the first horizontal location L1 while the user is typing, and the user's palms are hovering over the second horizontal location L2 while the user is typing.

Figure 7:
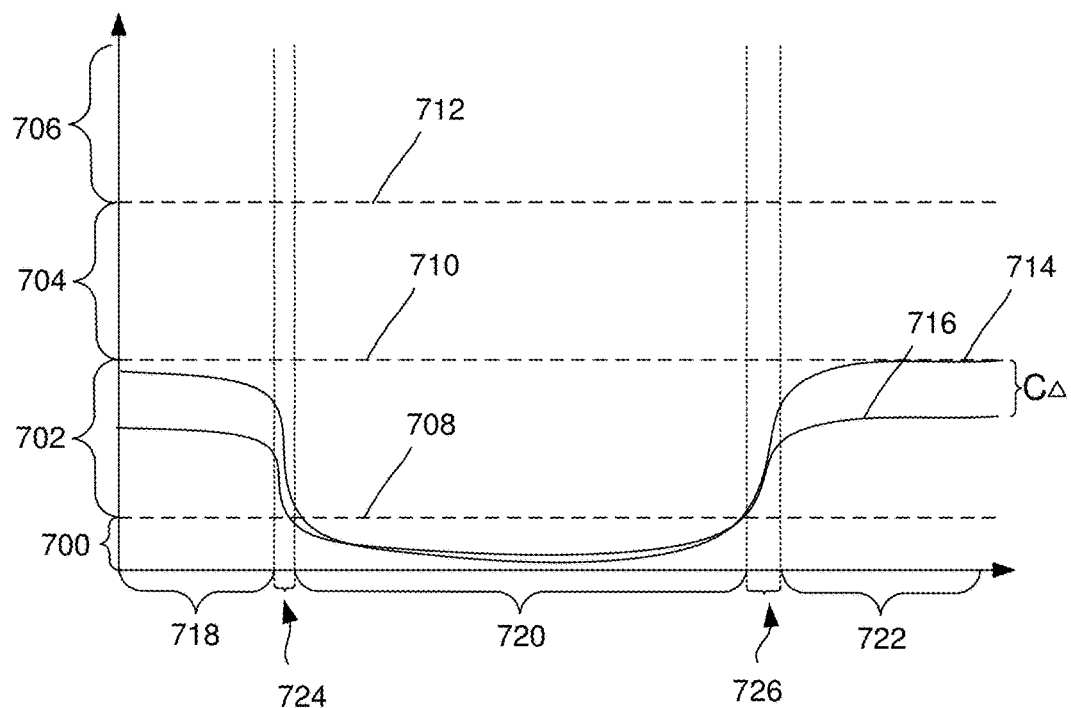
FIG. 7 depicts an example of a measurement in accordance with the disclosure.
Figure 8:
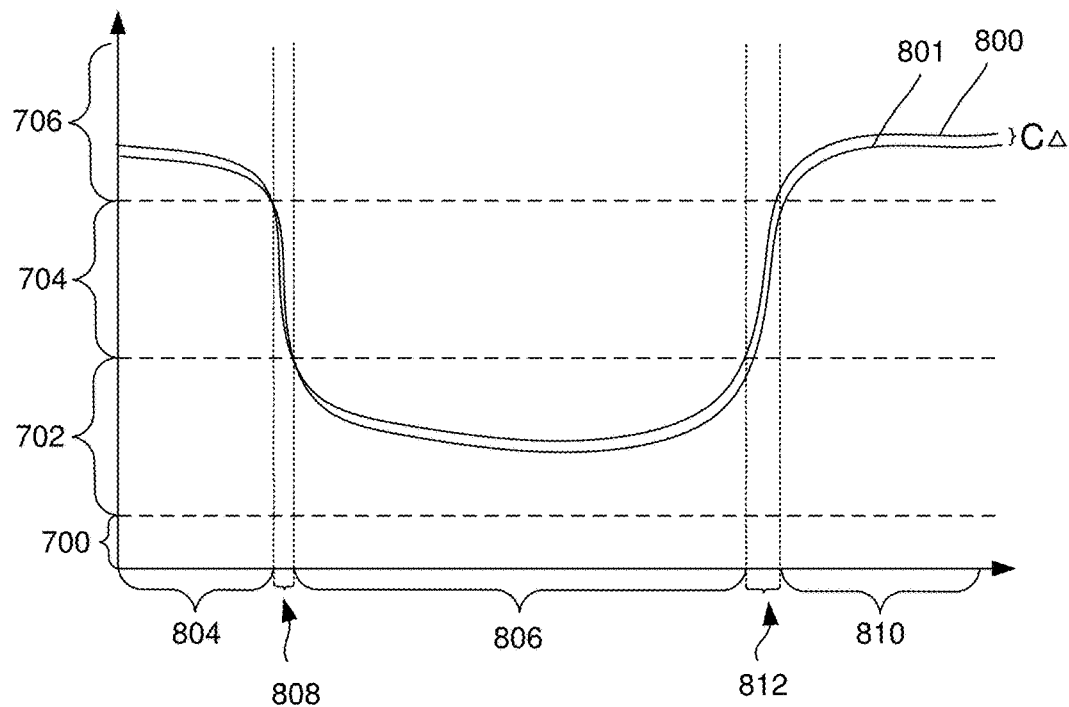
FIG. 8 depicts an example of a measurement in accordance with the disclosure.

FIGS. 7-8 depicts examples of capacitance measurements along the first horizontal location L1 and the second horizontal location L2. FIG. 7 depicts an example of capacitance measurement along the first horizontal location L1 which is near the side of the touch pad closer to the keyboard, and FIG. 8 depicts an example of the capacitance measurement along the second horizontal location L2 which is near the side of the touch pad farther from the keyboard. The y-axis schematically represents a capacitance signal strength and the x-axis schematically represents a location along the width of the touch pad.

The capacitance signal strength may be divided into multiple ranges associated with types of inputs. For example, the signal strength may include a noise range 700, a proximity range 702, a finger touch range 704, and a palm touch range 706, another range, and/or combinations thereof. In some cases, a proximity threshold 708 separates the noise range from the proximity range, a finger touch threshold 710 separates the finger touch range from the proximity range, and a palm touch threshold 712 separates the palm touch range from the finger touch range. In some cases, these thresholds are established by the manufacturer, are derived from capacitance measurements, are modified based on the capacitance measurements, provided from another source, or combinations thereof.

A first capacitance measurement is represented by line 714 taken at a first time which was taken while the user is typing. In this example, multiple capacitance measurements are taken while the user is typing. A second capacitance measurement is represented by line 716 taken at a second time which was also taken while the user is typing, but after the first time. While the illustrated example depicts just two measurements taken while the user is typing, any number of measurements can be taken while the user is typing. The measurements at different locations along the horizontal dimensions of the touch pad may be different. Such differences between measurements may reflect the position of the user's hand, fingers, thumbs, and palms over different portions of the touch pad. The changes in capacitance signal strength at different times and locations along the horizontal dimensions may be an attribute that is associated with a user typing. In some cases, the changes in measurements within a predetermined time period may also be an attribute that is associated with a user typing.

The different measurements along the horizontal dimensions may have different values. For example, a first proximity region 718 of the measurement may include a capacitance signal strength value within the proximity range, a noise region 720 may correspond to a capacitance signal strength value within the noise range, and a second proximity region 722 may have capacitance signal strength values that are within the proximity range. In this case, the portion of the measurements with the values within the noise region 720 is between the portions of the measurements with values within the proximity regions 718, 722. In this case, the measurements associated with the proximity regions 718, 722 reflect the locations where the user's fingers are hovering over the part of the touch pad along location L1. The measurements associated with the noise region 720 reflect the locations that are positioned between the fingers that are part of the user's first hand and the fingers that are part of the user's second hand.

The changes in the slopes of line 714 may be used to identify the transitions. For example, a downward slope from the first proximity region 718 to the noise region 720 may indicate a first proximity boundary region 724 that reflects the edge of the area where the user's hand or fingers are hovering over the touch pad. In some cases, an upward slope from the noise region 720 to the second proximity region 722 may indicate a second proximity boundary region 726 that reflects the edge of the area where the user's hand or fingers are hovering over the touch pad. These changes in the slope of line 714 may be different from where the changes in slope are in line 716. In such a case, a boundary region may be an area where the user places the edge of his or her hand. For example, a specific user may typically place his or her hands such that the edge of the user's fingers are often within the identified proximity boundary regions. This feature may be stored as an attribute to assist in determining when a user is typing, resting his or her hands on the touch pad, making an unintentional input, determining another circumstance, or combinations thereof. In the example depicted in FIG. 7, the first proximity boundary region 724 is smaller than the second proximity boundary region 726 which illustrates that the user may move the edge of his or her right hand more than the edge of his or her left hand while typing.

In this example, the measurements along location L1 may include location of location of peaks, location of troughs, location of slopes, positive slopes, negative slopes, different slope angles, maximum values, minimum values, median values, average values, derived values, weighted values, distances between peaks, distances between troughs, differences between slopes, maximum distances, minimum distances, median distances, average distances, derived distances, weighted distances, other features, or combinations thereof. Each of these features may be stored attributes.

FIG. 8 depicts an example of the capacitance measurement along the second horizontal location L2. In this example, the first measurement at location L2 is represented by line 800, which was also taken at a first time, and the second measurement at location L2 is represented by line 801, which was also taken at a second time. Although, the measurements along the locations L1 and L2 were taken at the same time, the measurements along location L1 may have been taken with a different sense electrode than the measurements along location L2 and may have different capacitance signal strength values than each other. In the illustrated example depicted in FIG. 8, the first and third portions of the lines 800, 801 depict values that are higher than the first and third portions of lines 714 and 716 of FIG. 7. Location L2 crosses the palms of the user's hand while typing, and the high capacitance signal strength values of the first and third portions are within the palm touch range. The second portions of lines 800 and 801 cross the regions where the user's thumbs reside while the user is typing. In this illustrated example, lines 800 and 801 depict that the user's thumbs align with capacitance signal strength values in the proximity range implying that the user's thumbs are being held above the touch pad within the second portion while the user is typing.

The changes in the slopes of line 800 may be used to identify the transitions. For example, a downward slope from the first palm touch region 804 to the proximity region 806 may indicate a first palm boundary region 808 that reflects the edge of the area where the user's palm are resting on the touch pad. In some cases, an upward slope from the proximity region 806 to the second palm touch region 810 may indicate a second palm boundary region 812 that reflects the edge of the user's palm is resting on the touch pad. These changes in the slope of line 800 may be different from where the changes in slope in line 801. In such a case, a boundary region for the user's palms that may be typical for a general user or a specific user may be identified. For example, a specific user may typically rest his palms such that the edge of the user's fingers are often within the identified palm boundary regions 808, 812.

While the depicted example indicates that the user is resting his or her palms on the touch pad, in some cases, the user may hover his palms over the touch pad. Further, in other examples, the user may rest one palm on the touch pad while typing while hovering the other palm over the touch pad. In some cases, the user may rest at least one of his or her thumbs on the touch pad or the user may hover at least one of his or her thumbs over on the touch pad.

The system may analyze the data provided through the measurements to determine the boundaries for palms, fingers, thumbs, and/or other features of the user while the user is typing. In some examples, the system may analyze the data from the measurements to determine which capacitance signal strength values represent a noise range for a specific user, a proximity range for a specific user, a finger touch range for a specific user, a palm touch range for a specific user, a finger proximity range for a specific user, palm proximity range for a specific user, a thumb touch range for a specific user, a thumb proximity range for a specific user, another range for a specific user, or combinations thereof.

For example, in response to receiving a typing input, the programmed instructions of the controller may cause the capacitance sensor to take a measurement. The obtained measurement may include a high capacitance signal strength value in a far corner region of the touch pad. In some cases, a far region may include a region of the touch pad that is farther away from the keyboard as opposed to a near region which is a region that is nearer to the keyboard. Based on the high capacitance signal strength value and the probability that a user's palm may be positioned in such a corner of the touch pad, the system may determine that the high capacitance signal strength value reflects either a palm proximity value or a palm touch value. Accordingly, the system may narrow the capacitance signal strength values for these ranges. Additionally, the system may continue to take measurements while the user is typing and continue to take measurements for a short period of time after the system stops receiving typing inputs. This may allow the system to obtain a wide range of values in that particular far corner region of the touch pad. The system may determine that if there is a large fluctuation in these capacitance signal strength values that the higher capacitance signal strength values are likely to be part of the palm touch range and the lower capacitance signal strength values are likely to be part of the palm proximity range. In some situations, where the system may see the palm being lifted off of the touch pad at the conclusion of typing, the system may determine a range of the obtained capacitance signal strength values are part of the palm proximity range. Similar or different protocols may be used to determine which capacitance signal strength values may be associated with these different ranges.

Lines 800 and 802 are depicted as having more similar values to each other than the lines 714 and 716 as shown in FIG. 7. This may suggest that the palms of the user's hands may move less while the user is typing than the base of the fingers of the user's hands.

In some cases, the features and attributes identified in the measurements may reflect measurements that would be typical when a general user is typing. However, in some examples, the features and attributes identified may be specific to a specific user. While these examples depict that the measurements are just taken along the horizontal dimension at locations L1 and L2, measurements may be taken at more or fewer locations than depicted. For example, a measurement may be recorded at each sensor electrode of the capacitance sensor. In some examples, the vertically oriented electrodes may be used to take measurements. In some cases, at least some of the horizontally oriented electrodes and some of the vertically oriented electrodes are used to make the measurements.

Figure 9:
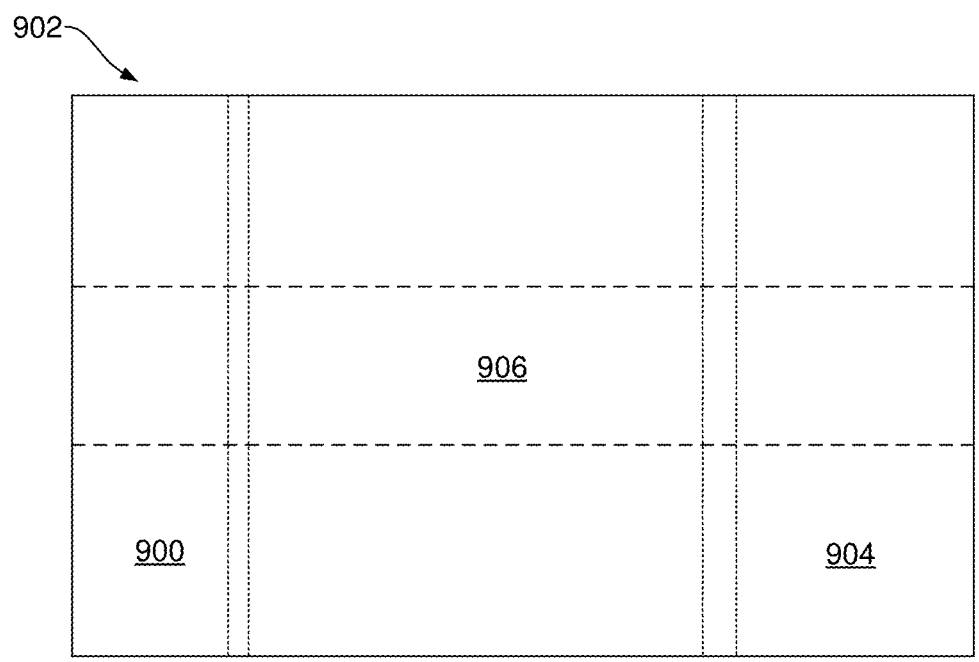
FIG. 9 depicts an example of regions of a capacitance sensor in accordance with the disclosure.

FIG. 9 depicts an example of regions of a capacitance sensor that may be configured based on the data from the measurements depicted in FIGS. 7 and 8. Each of these regions may be analyzed based on customized algorithms, assumptions, and/or conditions based on the measurements taken while the user is typing. For example, if a subsequent capacitance signal strength value is measured within a far corner region 900 of the touch pad 902 that exhibits a similar value to values measured while typing, the system may determine that the subsequent measurement reflects a palm resting on the touch pad. Such a conclusion may be reached even in situations where the controller is not receiving keyboard inputs. The system may assign noise thresholds, proximity thresholds, touch thresholds, palm touch thresholds, palm proximity thresholds, thumb touch thresholds, thumb proximity thresholds, finger touch thresholds, finger proximity thresholds, other thresholds, or combinations thereof. The system may assign palm regions, thumb regions, noise regions, proximity boundary regions, touch boundary regions, palm edge regions, thumb edge regions, finger edge regions, other regions, and combinations thereof. When the attributes of the subsequent measurements align with the attribute of these regions, the system may classify the types of inputs received from the user. Such classifications may assist in determining the type of command the user is intending to match, the type of gesture the user is intending to make, whether the input is an intentional input, whether the input is an unintentional input, make another decision, or combinations thereof.

In some cases, due to the frequency of the types of inputs that the system determines the user makes within these regions, the input measurements within these regions may be analyzed differently than in some of the other regions. For example, each of the regions may operate based on customized algorithms, assumptions, and/or conditions. For example, region 904 may frequently receive palm inputs and region 906 may frequently receive noise inputs. As such, the algorithms, assumptions, and/or conditions may be customized accordingly. In some cases where the percentage of inputs within a specific region is high, the high precision analysis may not be necessary. However, in other regions where a much wider variety of inputs are frequently determine, the algorithm, assumptions, and conditions may be different to make more granular decisions.

Figure 10:
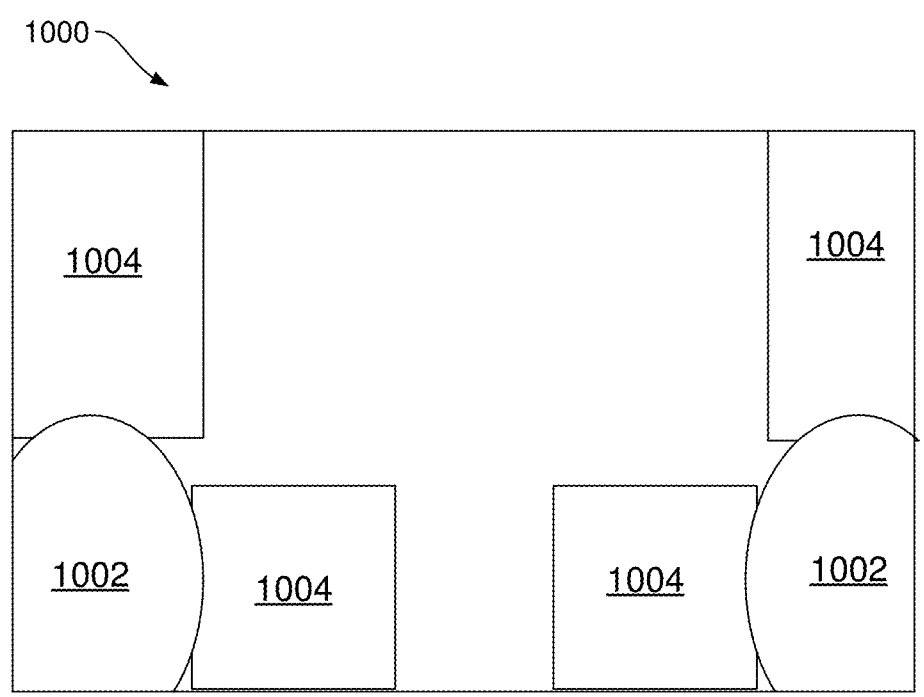
FIG. 10 depicts an example of regions of a capacitance sensor in accordance with the disclosure.

FIG. 10 depicts an example of regions of a capacitance sensor 1000 that may be configured based on the data from the measurements depicted in FIGS. 7 and 8. Each of these regions may be analyzed based on customized algorithms, assumptions, and/or conditions based on the measurements taken while the user is typing. These regions may be more customized than the regions identified in FIG. 9. In this example, just specific portions of the touch pad are assigned a region. Further, at least some of the regions are asymmetric, non-uniform, and/or customized. In the depicted example, the regions may include palm regions 1002 and proximity regions 1004.

Figure 11:
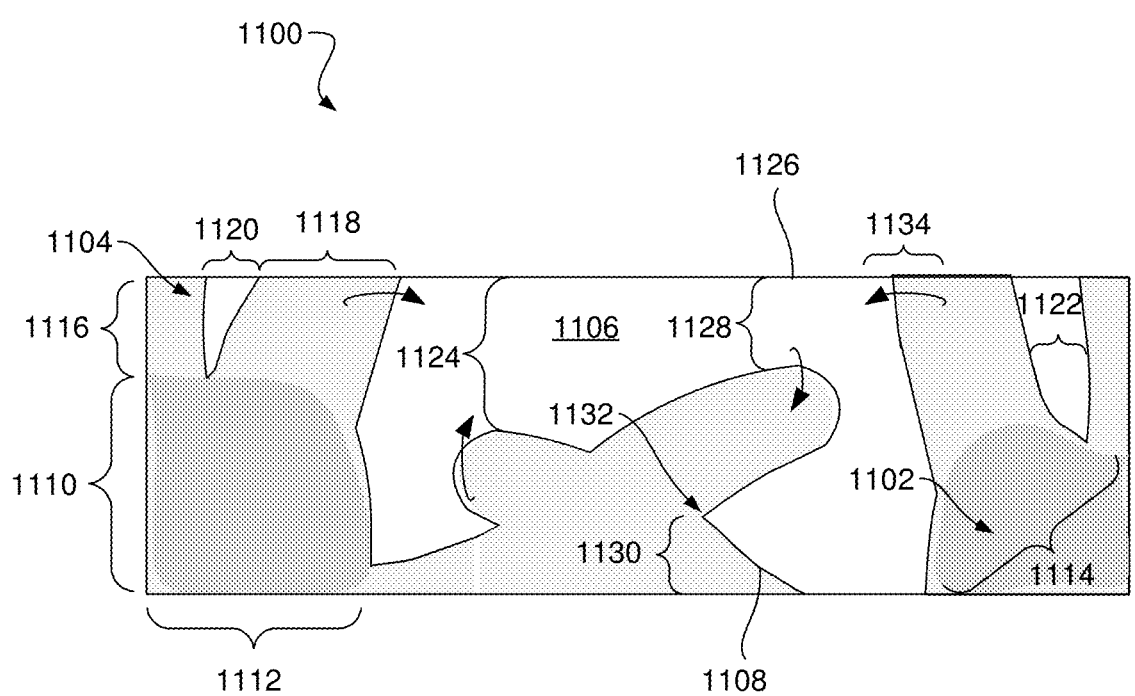
FIG. 11 depicts an example of a capacitance image in accordance with the disclosure.

FIG. 11 depicts an example of an image 1100 derived from capacitance signal strength data based on the measurements of FIGS. 7 and 8. In this example, the darker regions 1102 represent higher capacitance signal strength values associated with a palm, the lighter regions 1104 represent a lower capacitance signal strength values associated with fingers and/or thumbs in proximity, and the white regions 1106 represent capacitance signal strength values associated with noise. In some cases, boundaries 1108 may be calculated around the various regions.

In some examples, the dimensions of the image may be determined and stored as an attribute. In this example, a first dimension 1110 may be a palm length, a second dimension 1112 may be a palm width, and a third dimension 1114 may be a diagonal dimension of a palm region. In some examples, dimension 1116 may represent a finger length, dimension 1118 may represent a finger width, and dimension 1120 may represent a distance between features of the object depicted in the image at a first vertical position. Dimension 1122 may represent a distance between features depicted in the image at a second vertical position. Dimension 1124 may represent a distance between a first feature in the image and an edge 1126 of the capacitance sensor, and dimension 1128 may represent a distance between a second feature in the image and the edge 1126 of the capacitance sensor. Dimension 1130 may represent a distance between the edge 1126 and bend 1132 in a boundary.

In some cases, the images may be created from measurements that were taken at different times. In comparing the different images from different times, it may be observed that features in the images move over time, oscillate over time, have a movement pattern over time, rotate over time, shrink over time, expand over time, morph over time, make other changes over time, or combinations thereof. In some cases, the distance moved may be stored as a movement dimension 1134. Other movement dimensions of the images across time may be stored, including distance measurements, speed measurements, area change measurements, angle change measurements, rotation measurements, other movement measurements, or combinations thereof.

These types of dimension measurements, movement measurement, image measurements, and other types of measurements may be stored as stored attributes.

Figure 12:
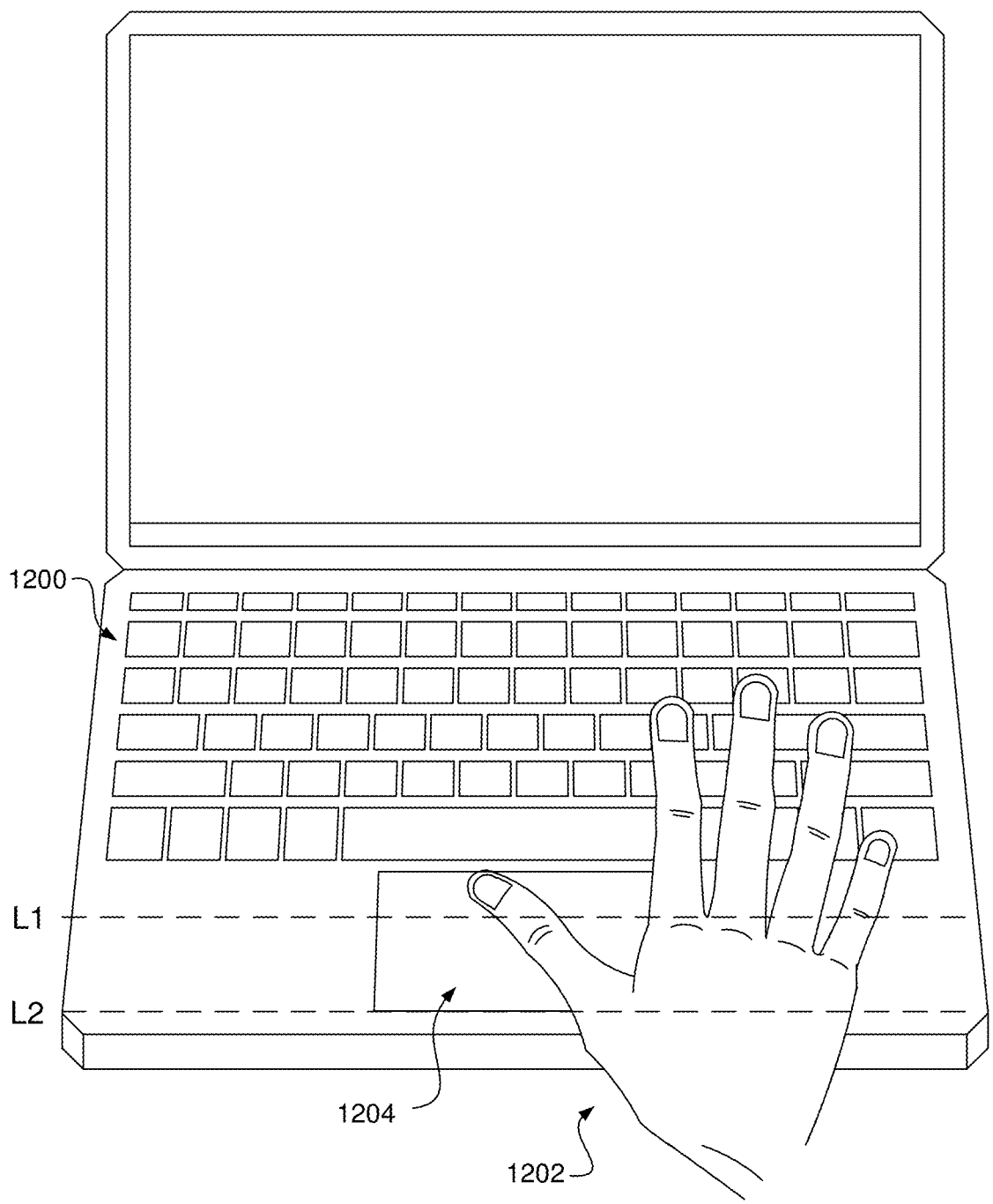
FIG. 12 depicts an example of providing a typing input in accordance with the disclosure.

FIG. 12 depicts an example of providing a typing input with a single hand 1200 into a keyboard 1202 where the keyboard 1202 is near the capacitance user interface 1204. Illustrative capacitance measurement that may correspond to the typing input of FIG. 12 are depicted in FIGS. 13 and 14.

Figure 13:
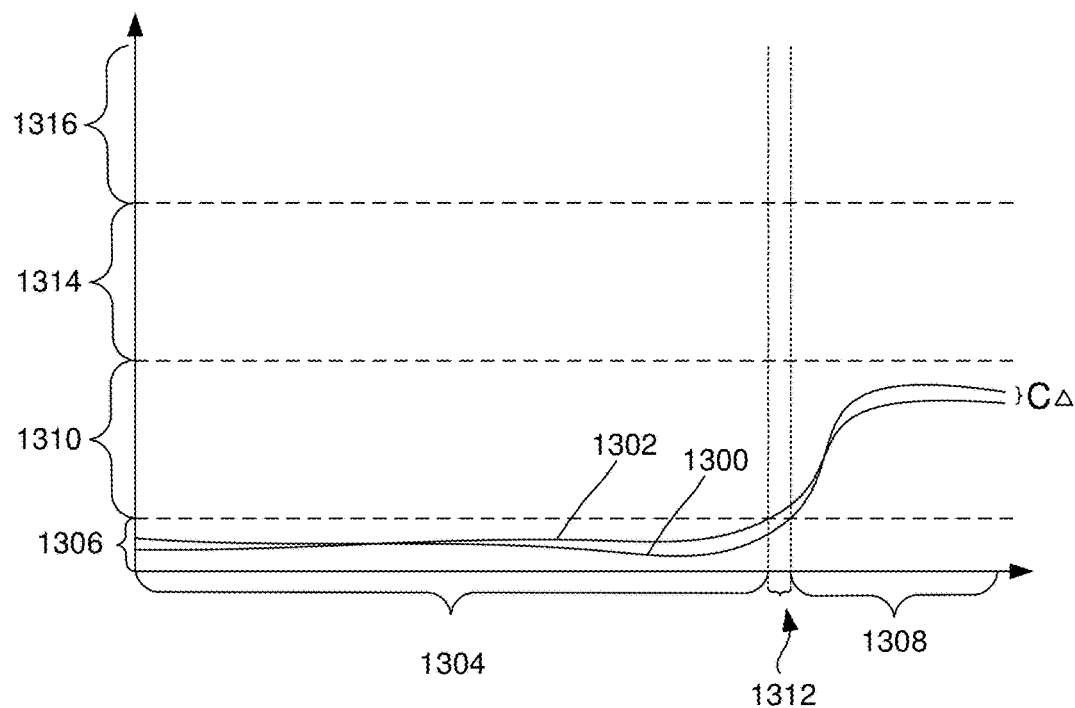
FIG. 13 depicts an example of a measurement in accordance with the disclosure.

FIG. 13 depicts an example of the capacitance measurement at location L1, which crosses the user's fingers. Line 1300 represents a first measurement taken at a first time, and line 1302 represents a second measurement taken at a second time. A first portion of the capacitance measurement corresponds to a noise region 1304 that has a capacitance signal strength in the noise range 1306. A second portion of the capacitance measurement corresponds to a proximity region 1308 that has a capacitance signal strength in the proximity range 1310. Due to the differences between the various times that the measurement is taken, a proximity boundary region 1312 may be identified where the edge of the proximity region 1308 most frequently resides. In this example, the measured capacitance values do not reach the finger touch range 1314 or the palm touch range 1316.

Figure 14:
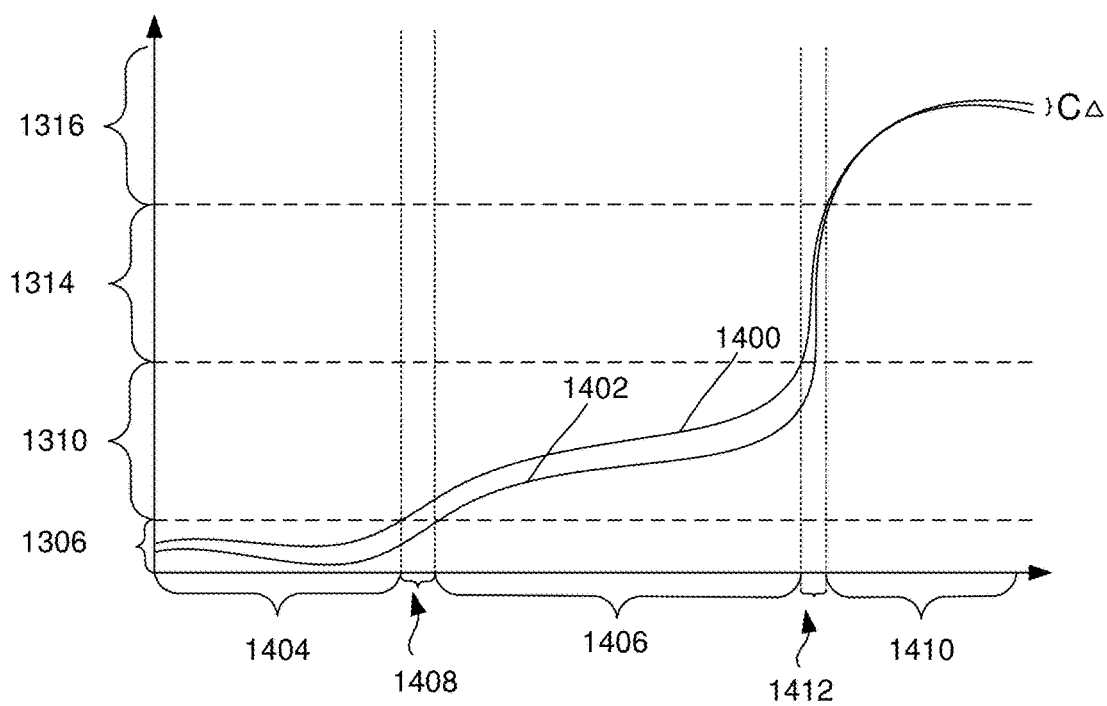
FIG. 14 depicts an example of a measurement in accordance with the disclosure.

FIG. 14 depicts an example of the capacitance measurement at location L2, which crosses the palm of the user's hand. Line 1400 represents a first measurement taken at the same time that line 1300 in FIG. 13 was taken, and line 1402 represents a second measurement taken at the same time that line 1302 in FIG. 13 was taken.

A first portion of the capacitance measurement corresponds to a noise region 1404 that has a capacitance signal strength in the noise range 1306. A second portion of the capacitance measurement corresponds to a proximity region 1406 that has a capacitance signal strength in the proximity range 1314. This region may represent where the user is hovering his or her thumb over the touch pad while typing. Due to the differences between the various times that the measurement is taken, a proximity boundary region 1408 may be identified where the edge of the proximity region 1406 most frequently resides. A third portion of the capacitance measurement corresponds to a palm region 1410 that has a capacitance signal strength in the palm touch range 1316. Due to the differences between the various times that the measurement is taken, a palm boundary region 1412 may be identified where the edge of the palm region 1410 most frequently resides.

Figure 15:
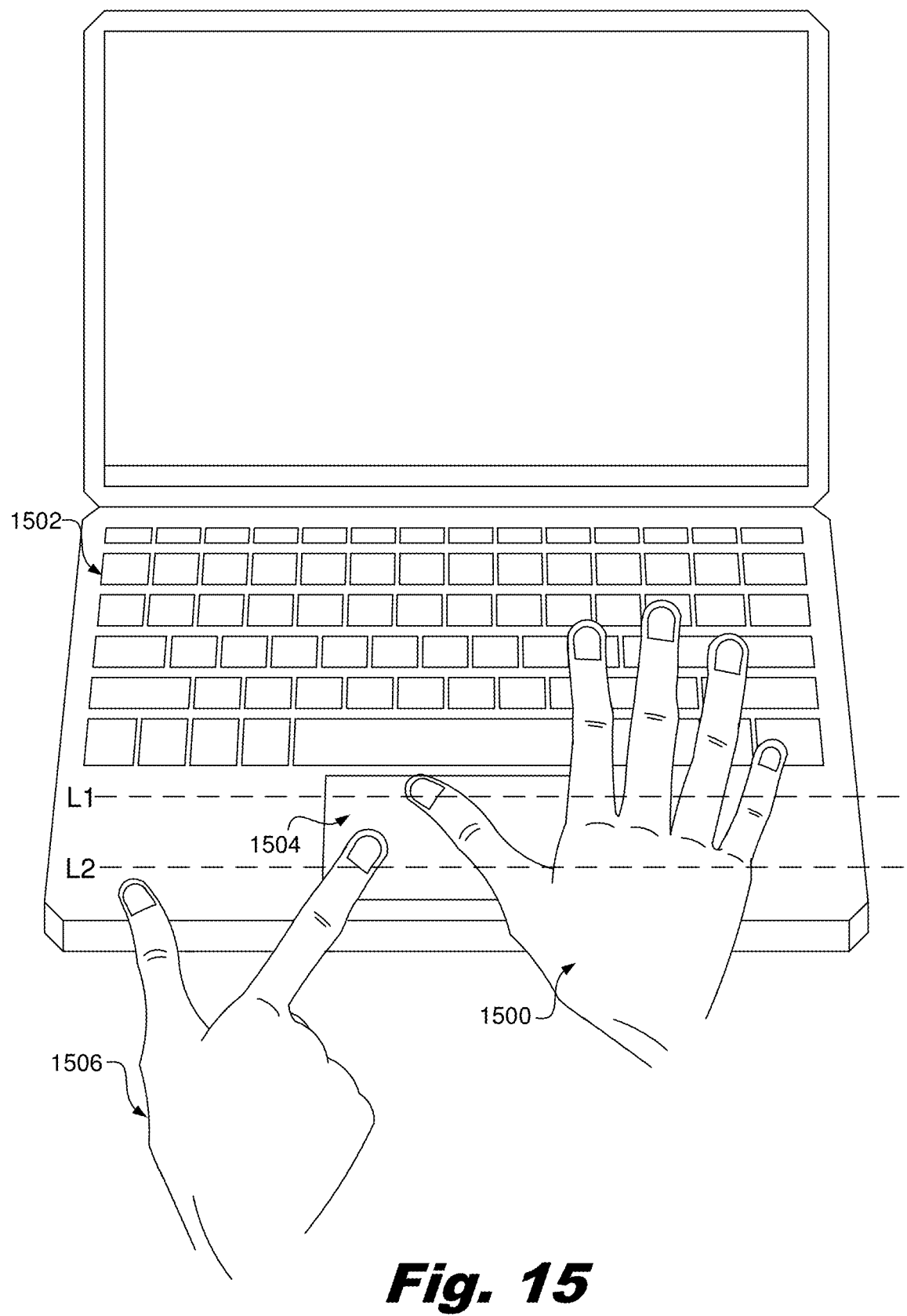
FIG. 15 depicts an example of proving a typing input and a capacitance input in accordance with the disclosure.

FIG. 15 depicts an example of providing a typing input with a single hand 1500 into a keyboard 1502 and also of providing a touch input into a capacitance input device 1504 next to the keyboard 1502 with a different hand 1506. Illustrative capacitance measurements that may correspond to the typing input of FIG. 15 are depicted in FIGS. 16 and 17.

Figure 16:
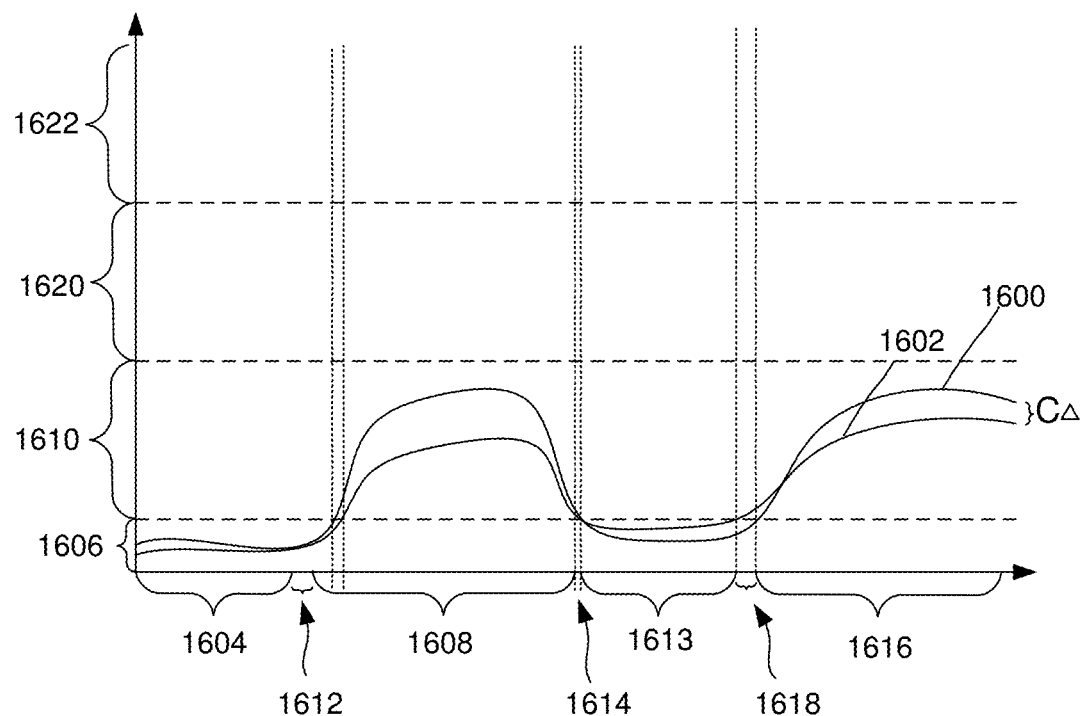
FIG. 16 depicts an example of a measurement in accordance with the disclosure.
Figure 17:
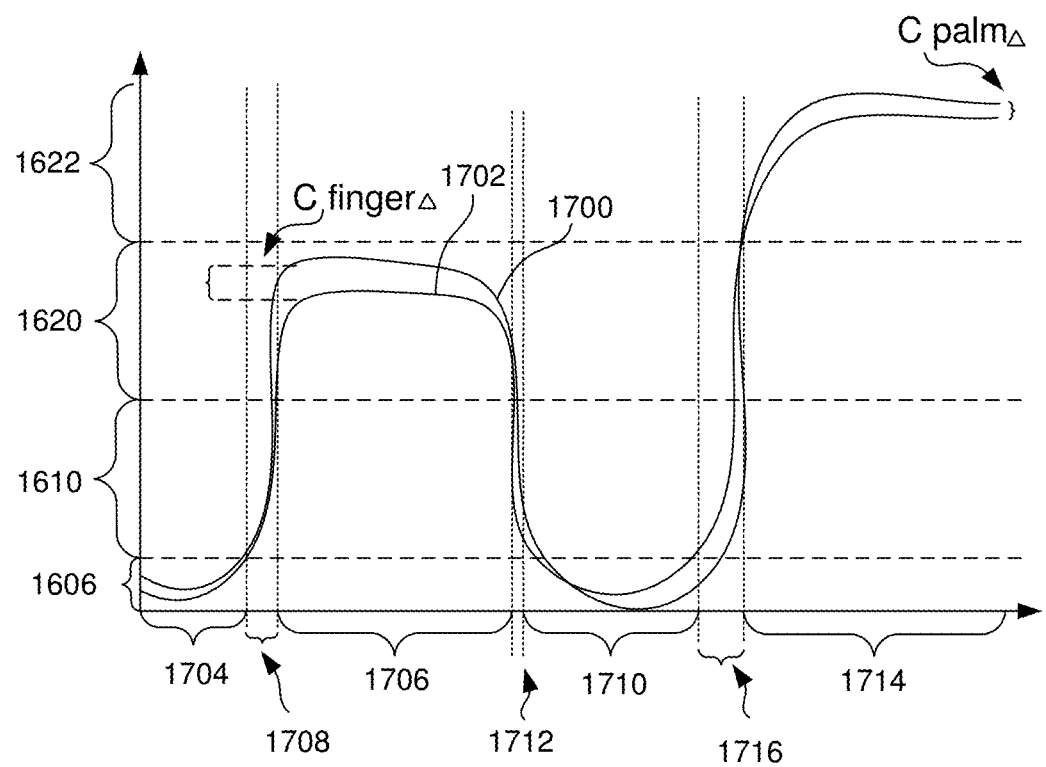
FIG. 17 depicts an example of a measurement in accordance with the disclosure.

FIG. 16 depicts an example of the capacitance measurement at location L1, which crosses the user's fingers and thumb hovering over the touch pad while the user is typing. Line 1600 represents a first measurement taken at a first time, and line 1602 represents a second measurement taken at a second time.

A first portion of the capacitance measurement corresponds to a first noise region 1604 that has a capacitance signal strength in the noise range 1606. A second portion of the capacitance measurement corresponds to a first proximity region 1608 that has a capacitance signal strength in the proximity range 1610. This first proximity region 1608 may correspond to an area where the user hovers his thumb over the touch pad while typing on the keyboard. Due to the differences between the various times that the measurement is taken, a first proximity boundary region 1612 may be identified where a first edge of the first proximity region 1608 most frequently resides.

A third portion of the capacitance measurement corresponds to a second noise region 1613 that has a capacitance signal strength in the noise range 1606. This second noise region 1613 may correspond to an area between where the user's thumb and fingers are hovering over the touch pad while the user is typing. Due to the differences between the various times that the measurement is taken, a second proximity boundary region 1614 may be identified where a second edge of the first proximity region 1608 most frequently resides.

A fourth portion of the capacitance measurement corresponds to a second proximity region 1616 that has a capacitance signal strength in the proximity range 1610. Due to the differences between the various times that the measurement is taken, a third proximity boundary region 1618 may be identified where an edge of the second proximity region 1616 most frequently resides. In this example, the measured capacitance values do not reach the finger touch range 1620 or the palm touch range 1622.

FIG. 17 depicts an example of the capacitance measurement at location L2, which crosses the user's finger touching the touch pad making a user input directly to the touch pad and the user's palm touching the touch pad while the user is typing. Line 1700 represents a first measurement taken at a first time, and line 1702 represents a second measurement taken at a second time.

A first portion of the capacitance measurement corresponds to a first noise region 1704 that has a capacitance signal strength in the noise range 1606. A second portion of the capacitance measurement corresponds to a finger touch region 1706 that has a capacitance signal strength in the finger touch range 1620. This finger touch region 1706 may correspond to the region where the user touches his finger to the touch pad while his other hand is typing on the keyboard. Due to the differences between the various times that the measurement is taken, a first finger boundary region 1708 may be identified where a first edge of the finger touch region most frequently resides.

A third portion of the capacitance measurement corresponds to a second noise region 1710 that has a capacitance signal strength in the noise range 1606. This second noise region 1710 may correspond to a region between where the user's finger is touching the touch pad and the user's palm is touching the touch pad while the user is typing. Due to the differences between the various times that the measurement is taken, a second finger boundary region 1712 may be identified where a second edge of the finger region most frequently resides.

A fourth portion of the capacitance measurement corresponds to a palm region 1714 that has a capacitance signal strength in the palm touch range 1322. Due to the differences between the various times that the measurement is taken, a palm boundary region 1716 may be identified where an edge of the palm region 1714 most frequently resides.

Figure 18:
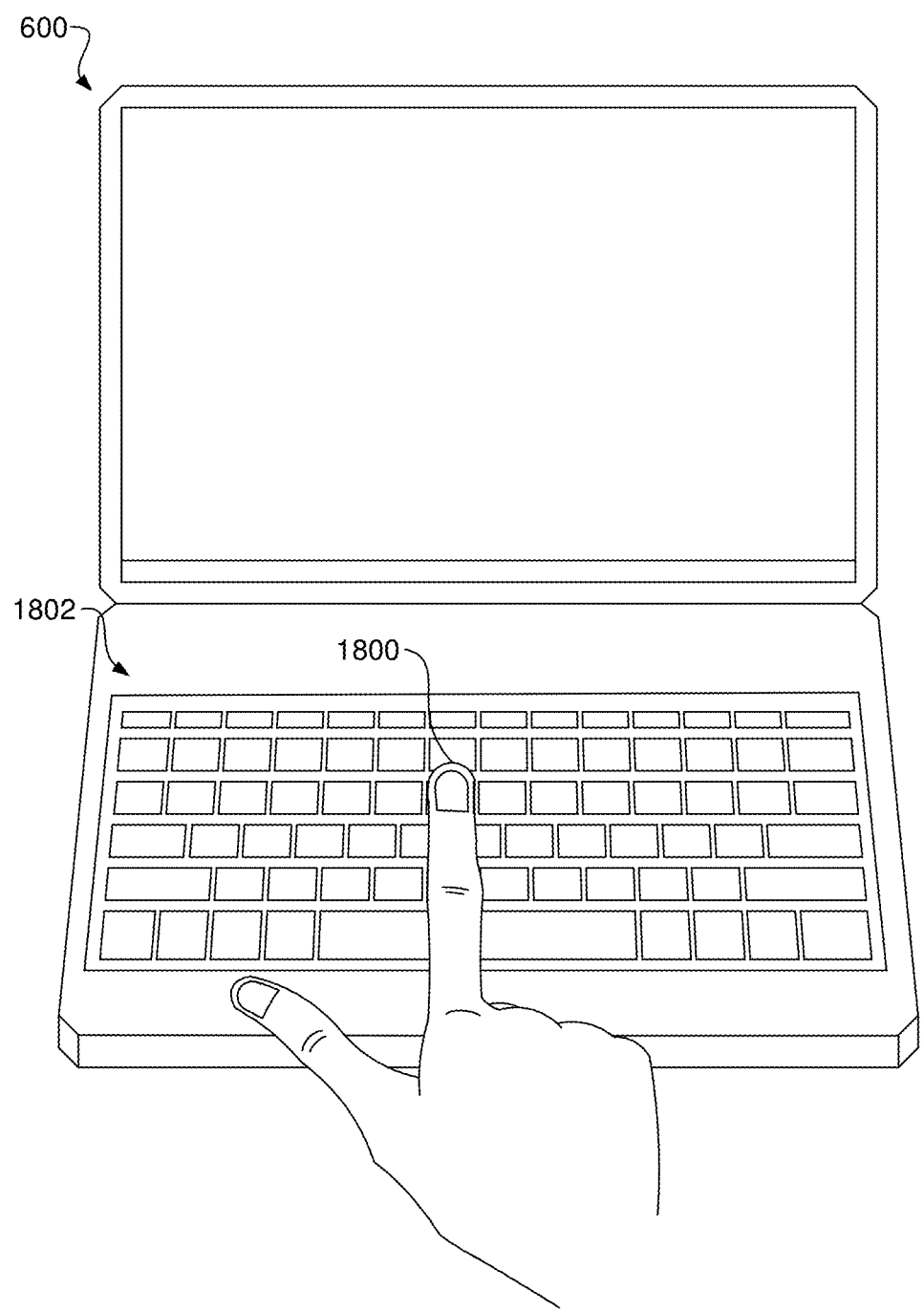
FIG. 18 depicts an example of providing a typing input in accordance with the disclosure.

FIG. 18 depicts an example of a user touching a virtual key 1800 of a virtual keyboard 1802. Capacitance measurements may be taken as described above to create an image of the finger touching the virtual keyboard.

Figure 19A:
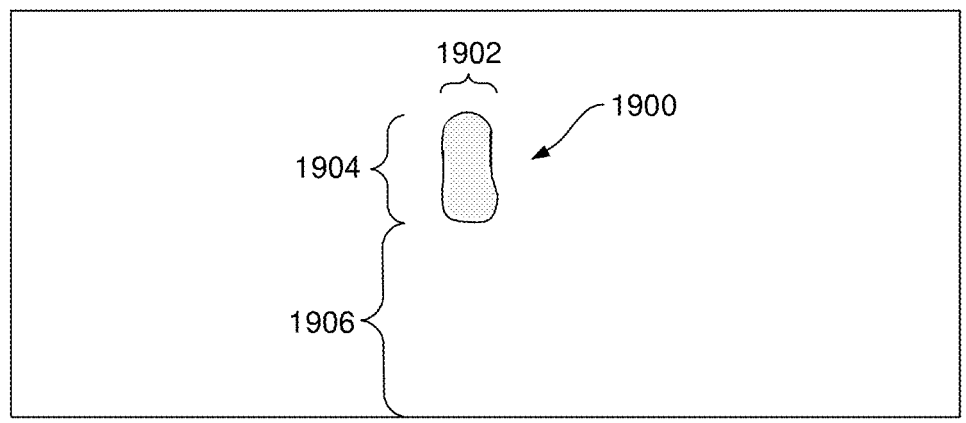
FIG. 19A depicts an example of a capacitance image in accordance with the disclosure.
Figure 19B:
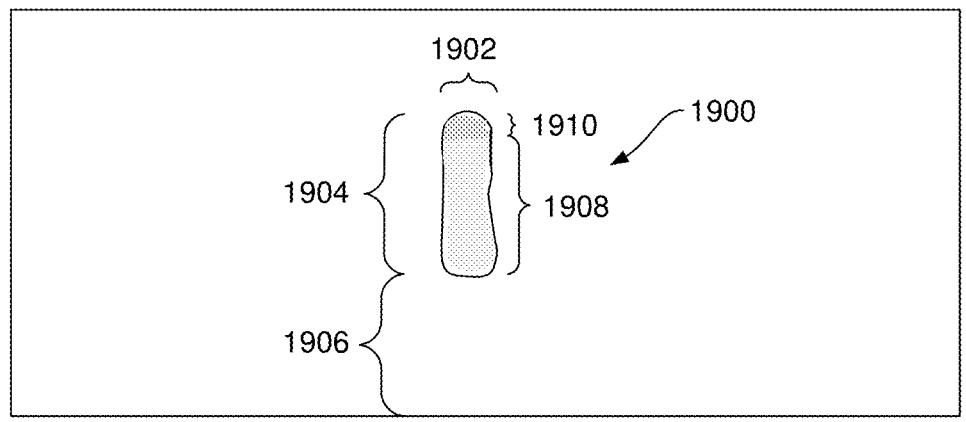
FIG. 19B depicts an example of a capacitance image in accordance with the disclosure.
Figure 19C:
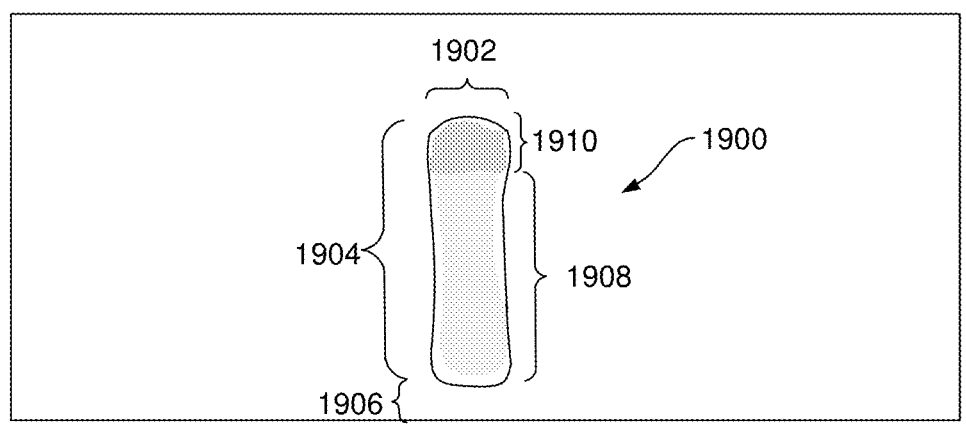
FIG. 19C depicts an example of a capacitance image in accordance with the disclosure.

FIGS. 19A-19C depict examples of images that may be derived from the capacitance measurements taken from the embodiment depicted in FIG. 18 taken over time as the finger progressively approaches the touch pad and makes contact. In these examples, a darker colored region may depict a higher the capacitance signal strength value than a lighter colored region.

FIG. 19A depicts an example of the finger approaching the touch pad before making contact with a surface of the touch pad. In this example, the capacitance measurements that are within the proximity range may be used to construct a shape 1900 of a portion of the approaching finger. Image dimensions may be recorded from this image and become stored attributes. In this example, a width 1902 of the shape may be recorded, a length 1904 of the shape may be recorded, a distance 1906 from a far edge of the touch pad to the shape 1900 may be recorded, or combinations thereof. In some instances, the far edge of the touch pad may refer to an edge of the touch pad that is farther away from the display screen of the electronic device, an edge of the virtual keyboard that is closest to the user, or combinations thereof. In some instances, a near edge of the touch pad may refer to an edge of the touch pad that is closer to the display screen of the electronic device, an edge of the virtual keyboard that is farther away from the user, or combinations thereof.

Other image dimensions may be recorded. For example, a non-exhaustive list of other dimensions that may be recorded include, but are not limited to, a distance to a near edge of the touch pad, a distance to another edge of the touch pad, a surface area of the shape, a classification of the shape, a spline of the shape, a curvature of a portion of the shape, a relative location of a corner of the shape, a centroid of the shape, a central axis of the shape, an angle of the central axis of the shape, another dimension of the shape, or combinations thereof.

FIG. 19B depicts an example of the finger continuing to approach the touch pad and making slight contact with a surface of the touch pad at the fingertip. In this example, a first part 1908 of the shape 1900 is within the proximity range and a second part 1910 of the shape 1900 is within the finger touch range. These capacitance measurements may be used to modify the shape 1900 of the approaching finger. Image dimensions may be recorded from this image and become stored attributes. In this example, the width 1902 of the shape, the length 1904 of the shape, and the distance 1906 from a far edge of the touch pad have changed from the time that the image was constructed in FIG. 19A. Additionally, the length, width, and other dimensions of the regions within the finger touch range may also be recorded.

The new dimension may be recorded as stored attributes. In some cases, the stored attributes may be referenced with respect to the time difference between when the measurements were taken with respect to the image of FIG. 19A and when the measurements were taken with respect to the image of FIG. 19B. The changes in the dimensions may be used to determine movement attributes of the image. These movement attributes may also become stored attributes.

FIG. 19C further depicts an example of the finger in contact with a surface of the touch pad at the fingertip. In this example, some of the capacitance measurements are within the proximity range and some of the capacitance measurements are with the finger touch range. These capacitance measurements may be used to further modify the shape 1900 of the finger. The changed image dimensions and the respective movement dimensions may be recorded and become stored attributes.

Figure 20:
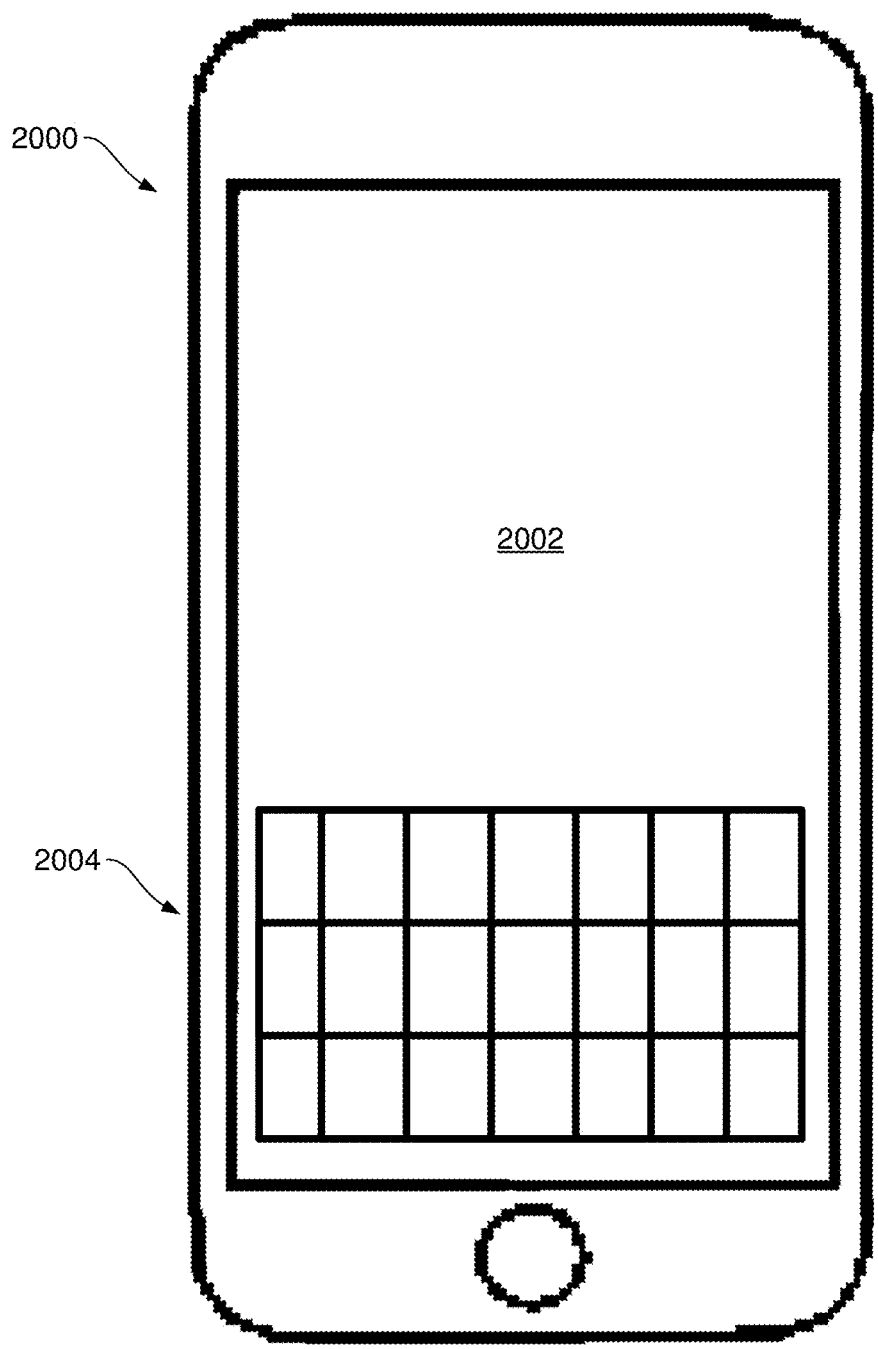
FIG. 20 depicts an example of an electronic device in accordance with the disclosure.

FIG. 20 depicts an example of an electronic device 2000 that may utilize the principles described in this disclosure. In this case, the electronic device 2000 includes a touch screen 2002 that incorporates the virtual keyboard 2004.

Figure 21:
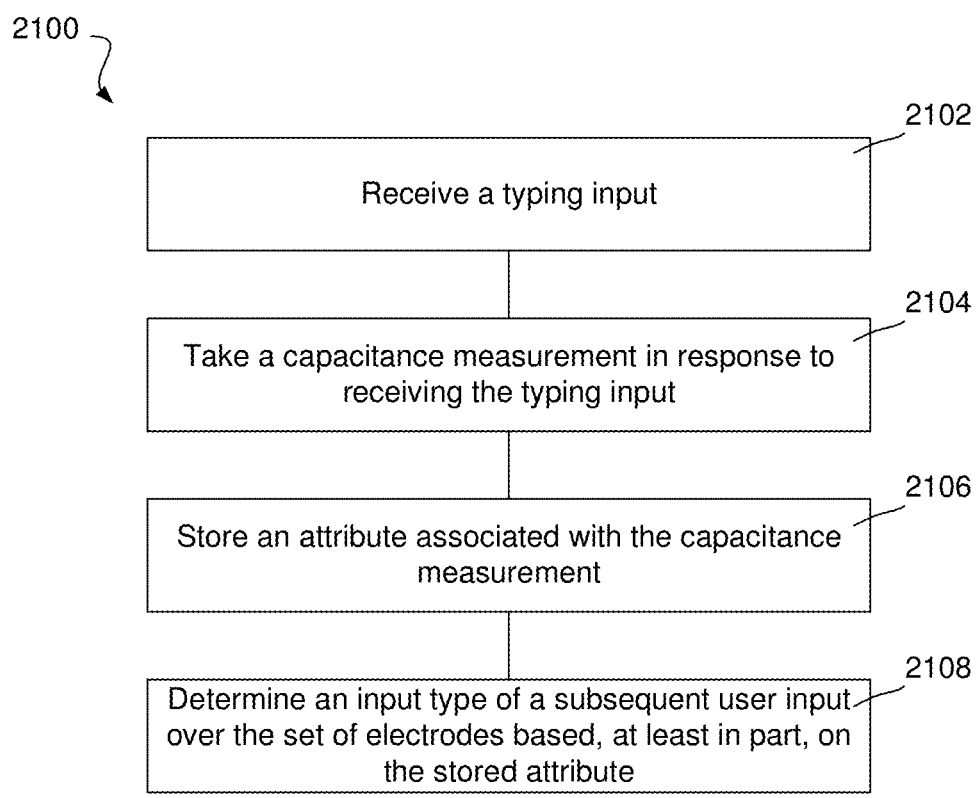
FIG. 21 depicts an example of a method of classifying an input in accordance with the disclosure.

FIG. 21 depicts an example of a method 2100 of responding to a typing input. This method 2100 may be performed based on the description of the devices, modules, and principles described in relation to FIGS. 1-20. In this example, the method 2100 includes receiving 2102 a typing input; taking 2104 a capacitance measurement in response to receiving the typing input; storing 2106 an attribute associated with the capacitance measurement; and determining 2108 an input type of a subsequent user input over the set of electrodes based, at least in part, on the stored attribute.

Figure 22:
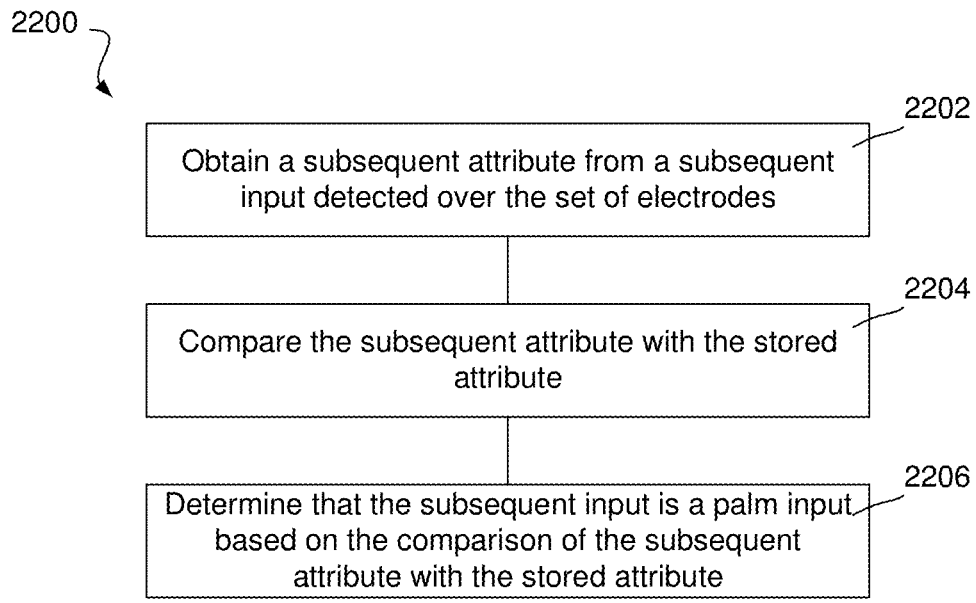
FIG. 22 depicts an example of a method of responding to a typing input in accordance with the disclosure.

FIG. 22 depicts an example of a method 2200 of responding to a typing input. This method 2200 may be performed based on the description of the devices, modules, and principles described in relation to FIGS. 1-21. In this example, the method 2200 includes obtaining 2202 a subsequent attribute from a subsequent input detected over the set of electrodes, comparing 2204 the subsequent attribute with the stored attribute, and determining 2206 that the subsequent input is a palm input based on the comparison of the subsequent attribute with the stored attribute.

Figure 23:
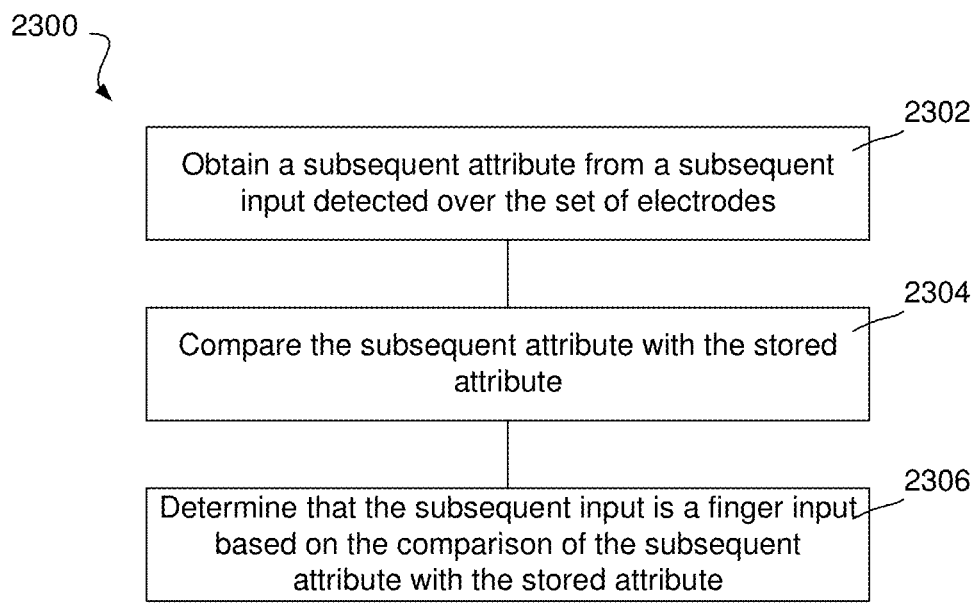
FIG. 23 depicts an example of a method of responding to a typing input in accordance with the disclosure.

FIG. 23 depicts an example of a method 2300 of responding to a typing input. This method 2300 may be performed based on the description of the devices, modules, and principles described in relation to FIGS. 1-22. In this example, the method 2300 includes obtaining 2302 a subsequent attribute from a subsequent input detected over the set of electrodes, comparing 2304 the subsequent attribute with the stored attribute, and determining 2306 that the subsequent input is finger input based on the comparison of the subsequent attribute with the stored attribute.

Figure 24:
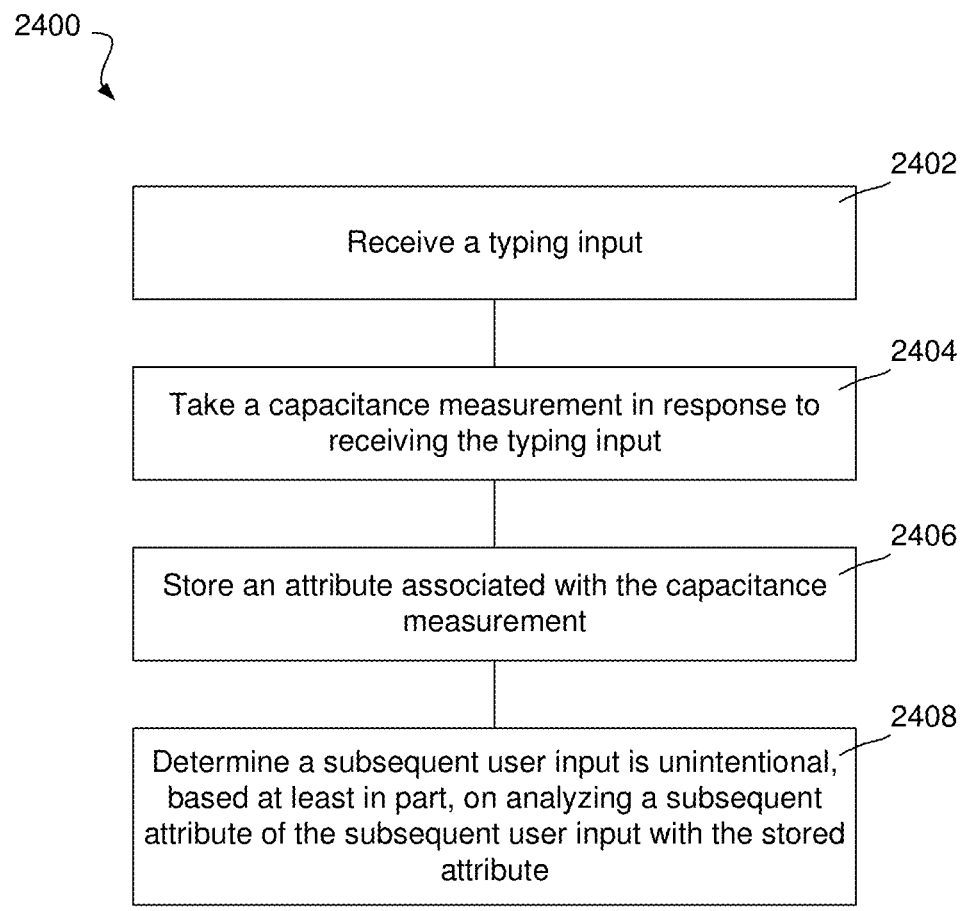
FIG. 24 depicts an example of a method of responding to a typing input in accordance with the disclosure.

FIG. 24 depicts an example of a method 2400 of responding to a typing input. This method 2400 may be performed based on the description of the devices, modules, and principles described in relation to FIGS. 1-23. In this example, the method 2400 includes receiving 2402 a typing input; taking 2404 a capacitance measurement in response to receiving the typing input; storing 2406 an attribute associated with the capacitance measurement; and determining 2408 a subsequent user input is unintentional based, at least in part, on analyzing a subsequent attribute of the subsequent user input with the stored attribute.

As the user performs the typing input, the input device may take multiple capacitance measurements to capture the dynamic capacitance changes associated with the typing input. These measurements may include attributes such as the speed, direction, pressure, surface area of the touch, or combinations thereof.

For example, as the user performs the typing input, the input device may record the location of the initial touch point, the path of the moving objects depicted in the measurement, and the location of the final touchpoints. This data may help the input device form a more comprehensive reference dataset. In some cases, the user's finger, palm, thumb, etc. may slide or rotate while typing. Thus, portions of the user's finger, thumb, palm, etc. may move from a first location to a second location while typing.

In some cases, in response to a determination that an input is an intentional user input, the system may move a cursor or respond to the user's intended input. In some cases, finger inputs and thumb inputs may be classified as intentional inputs. In some cases, proximity inputs may be classified as intentional inputs. In some cases, proximity inputs may be determined as intentional inputs if certain proximity attributes are also identified. For example, a proximity input that includes an attribute associated with a specific gesture may be recognized as an intentional user input. In some cases, a palm input may be determined as intentional input if certain palm attributes are also identified. For example, a palm input that includes an attribute associated with a specific movement that is recognize as a gesture may be recognized as an intentional user input.

In some cases, in response to a determination that an input is an unintentional user input, the system may ignore the input, reject the input, disable the capacitance sensor for a predetermined amount of time, disable a portion of the capacitance sensor for a predetermined amount of time, change a sensitivity threshold value, fail to rely to the user input, send a message to the user, provide an audible alert, provide another response, or combinations thereof. In some cases, any palm input may be determined to be an unintentional user input. In some cases, a proximity input may be determined to be an unintentional user input. In some cases, a combination of a proximity input followed by a finger or thumb input may be classified as part of an intentional user input.

In some cases, finger inputs and thumb inputs may be classified as intentional inputs. In some cases, proximity inputs may be classified as intentional inputs. In some cases, proximity inputs may be determined as intentional inputs if certain proximity attributes are also identified. For example, a proximity input that includes an attribute associated with a specific gesture may be recognized as an intentional user input. In some cases, a palm input may be determined as an intentional input if certain palm attributes are also identified. For example, a palm input that includes an attribute associated with a specific movement that is recognize as a gesture may be recognized as an intentional user input.

During the process of determining and storing attributes, a capacitance module may train machine learning models based on measurements gathered during the process. During operation, inputs to the capacitance module may be passed to the machine learning models, and the inputs may be classified based, at least in part, on the output of the models.

A machine learning model may be a k-nearest-neighbors model, a logistic regression model, a decision tree model, a random forest model, a gradient boosting machine, a support vector machine, a neural network, another machine learning model, or combinations thereof.

In some examples, a machine learning model may be trained and stored on processing resources and memory belonging to a capacitance module itself. In other examples, a machine learning model may be trained and stored on device resources pertaining to a device in electronic communication with a capacitance module.

The capacitance module may cause a calibration process to be initiated when a user sets up his or her profile associated with an electronic device. In some examples, the calibration process may be initiated in response to a user request. For example, the system may request that the user type a phase, type a specific phrase, select a specific keyboard button, type a specific sequence of keyboard buttons, perform another task, or combinations thereof. In some examples, the calibration process may be initiated in response to an event-based trigger, such as turning on an electronic device, updating software, changing a setting associated with the input device, a program request, a user request, opening a program with the electronic device, updating a user profile, another event-based trigger, or combinations thereof. In some examples, the calibration process may be re-initiated on a reoccurring basis.

In cases where the calibration process is repeated, the datasets gathered from the previous calibration process may be replaced with datasets from the most recent calibration. However, in other examples, the dataset from the most recent calibration may be used to update or refine processed stored attributes. In other examples, the stored attributes may include attributes from multiple calibrations.

In some examples, each unique user of an electronic device may have his or his own profile. In such an example, each profile may be associated with a unique dataset having stored attributes unique to each user.

In some examples, the system may induce noise into the system while the user is typing to determine what a typing input looks like while the user is typing and the noise is induced in the system. In this way, the system may recognize typing patterns while the noise is induced. The noise may be induced by an antenna, a near field antenna, a Wi-Fi antenna, a Bluetooth antenna, a haptic device, a speaker, a non-capacitance mechanism, a light emitting diode, a light source, an optical device, a vibrational device, a radar device, an ultrasonic device, another type of device, or combinations thereof. In some cases, the noise generated may affect the capacitance measurement. The system may store an attribute specific to when the noise inducing mechanism is activated. When classifying a type of unprompted input, the system may consult the stored attributes by comparing the recorded capacitance measurements with attributes that were taken while the noise-inducing mechanism was activated and when the noise-inducing mechanism was not activated.

For example, while the system is recording the capacitance measurement while the user is typing, the system may also activate an antenna, which may induce electromagnetic noise into the environment around the capacitance module. The antenna's signal may or may not affect the capacitance measurement. The system may record at least one attribute from typing before the antenna is induced and store at least another attribute while the antenna is induced. The system may store a typing attribute that is different from a non-antenna typing attribute.

A non-exhaustive list of attributes that the system may store includes, but is not limited to, antenna finger attributes, antenna palm attributes, antenna thumb attributes, antenna stylus attributes, antenna proximity attributes, antenna corner attributes, antenna central region attributes, antenna typing attributes, antenna wet finger attributes, antenna wet palm attributes, antenna wet thumb attributes, antenna wet stylus attributes, antenna wet proximity attributes, antenna corner wet attributes, antenna wet central region attributes, antenna web typing attributes, non-antenna finger attributes, non-antenna palm attributes, non-antenna thumb attributes, non-antenna stylus attributes, non-antenna proximity attributes, non-antenna corner attributes, non-antenna central region attributes, non-antenna typing attributes, non-antenna wet finger attributes, non-antenna wet palm attributes, non-antenna wet thumb attributes, non-antenna wet stylus attributes, non-antenna wet proximity attributes, non-antenna corner wet attributes, non-antenna wet central region attributes, non-antenna web typing attributes, other antenna attributes, other non-antenna attributes, another non-antenna wet attributes, other antenna wet attributes, or combination of thereof.

In some cases, the system may prompt the user to make a typing input while wearing a glove, while a drop of water is on the input device, while wearing a ring, while wearing a watch, while wearing a bracelet, while wearing a metallic object, while sitting in a chair, while standing, while using headphones or another wearable device, while performing a task that the user often does while providing user inputs into the user device, or combinations thereof. In some cases, rings, jewelry, watches, etc. may affect the capacitance signal. In other examples, wearing gloves may also weaken the capacitance signal. Some electronic devices that the user wears may impose an electronic frequency on the user, which may be picked up in the capacitance measurement. For example, some wearable device, pacemakers, other medical devices, and so forth may impose a frequency that may be conducted by the user's body and be detected with the capacitance sensor. Such a frequency may affect the respective stored attribute.

A typing prompt may request that the user type a specific phrase on a keyboard incorporated into the electronic device. In some cases, the prompt may request that the user type a specific key or a sequence of keys. The key or sequence of keys may be located on a right-hand side of the keyboard, a left-hand side of the keyboard, or in combinations thereof. In some situations, the user may provide the prompted input with a single hand or the user may have to use both hands to comfortably provide the prompted input. In some cases, the prompt may request that the user select a virtual key incorporated into a touch screen, a touch pad, or another user input device.

In some examples, the user is not prompted to make a typing input, but the system recognizes that the user is making a typing input because the controller receive communication from the keyboard. For example, the keyboard may indicate specific keys that the user is selecting, phrases or words that the user is typing, a sequence of keys that the user selects, the regions of the keyboard where the user is typing, just that the user is using the keyboard in general, or combinations thereof. Based on this unprompted inputs, the controller may calibrate the system and/or determine at least one stored attribute.

While the user is providing the typing input, the user may or may not place his or her hands on the touch pad or touch screen. In some cases, a user may have a habit of lifting his or her hands off of the touch pad while typing. In other cases, the user may have a habit of resting his or her hands on the edges of the touch pad while typing. In yet other cases, the user may have the habit of resting his or her hands over an area that encompasses more than just edges of the touch pad while typing. In yet an additional example, the user may have a habit of placing his or her hands outside of the touch pad's surface area while typing. The recorded capacitance measurements and therefore the stored attributes may reflect these typing habits of the user.

The system may include a method of recording a capacitance measurement from an unprompted user input, comparing the unprompted capacitance measurement with a stored capacitance attribute, and modifying the stored capacitance attribute based on the unprompted capacitance measurement.

The stored capacitance attribute may be any appropriate type of attribute as identified above. In some examples, based on the comparison, it may be determined that the unprompted user input has a matching characteristic to the stored attribute, is similar to a characteristic of the stored attribute, is within a standard deviation of the stored attribute, or combinations thereof. Such a comparison may result in classifying the unprompted user input as a particular type of user input. A non-exhaustive list of types of user inputs may include, but are not limited to, intentional inputs, accidental inputs, palm inputs, finger inputs, thumb inputs, stylus inputs, wet inputs, glove inputs, proximity inputs, other types of inputs, or combinations thereof.

In some cases, the stored capacitance attribute may be modified based on a single unprompted capacitance measurement. In other examples, multiple unprompted capacitance measurements may be collected and/or analyzed to determine a collective unprompted attribute. This unprompted attribute may be compared with the stored capacitance attribute. In cases where the stored capacitance attribute is different than the unprompted attribute, the unprompted attribute may be used to modify the stored capacitance attribute.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A capacitance module, comprising:
a set of electrodes;
a controller in communication with the set of electrodes;
memory in communication with the controller;
wherein the memory includes programmed instructions that cause the controller, when executed, to:
receive a typing input;
take a capacitance measurement in response to receiving the typing input;
store an attribute associated with the capacitance measurement; and
determine an input type of a subsequent user input over the set of electrodes based, at least in part, on the stored attribute;
wherein the input type is a palm input.

2. The capacitance module of claim 1, wherein the programmed instructions further cause the controller, when executed to:
obtain a subsequent attribute from a subsequent input detected over the set of electrodes;
compare the subsequent attribute with the stored attribute; and
determine that the subsequent input is a palm input based on the comparison of the subsequent attribute with the stored attribute.

3. The capacitance module of claim 2, wherein the programmed instructions further cause the controller, when executed to:
ignore the subsequent input in response to the determination that the subsequent input is a palm input.

4. The capacitance module of claim 2, wherein the programmed instructions further cause the controller, when executed to:
cancel the subsequent input in response to the determination that the subsequent input is a palm input.

5. The capacitance module of claim 2, wherein the programmed instructions further cause the controller, when executed to:
disable at least a portion of the capacitance sensor in response to the determination that the subsequent input is a palm input.

6. The capacitance module of claim 1, wherein the programmed instructions further cause the controller, when executed to:
obtain a subsequent attribute from a subsequent input detected over the set of electrodes;
compare the subsequent attribute with the stored attribute; and
determine that the subsequent input is a finger input based on the comparison of the subsequent attribute with the stored attribute.

7. The capacitance module of claim 1, wherein the input type is a finger input.

8. The capacitance module of claim 1, wherein the input type is a proximity input.

9. The capacitance module of claim 1, wherein typing input is from a keyboard in communication with the controller.

10. The capacitance module of claim 1, wherein typing input is from a virtual key positioned in proximity to the set of electrodes in communication with the controller.

11. The capacitance module of claim 1, wherein the attribute is a capacitance image dimension.

12. The capacitance module of claim 1, wherein the attribute is a capacitance image surface area.

13. The capacitance module of claim 1, wherein the attribute is a capacitance signal strength.

14. The capacitance module of claim 1, wherein the attribute is a capacitance image shape.

15. The capacitance module of claim 1, wherein the attribute is a capacitance image movement direction.

16. The capacitance module of claim 1, wherein the attribute is a capacitance image movement pattern.

17. The capacitance module of claim 1, wherein the program instructions further cause the controller, when executed to:
 receive a second typing input;
 take a second capacitance measurement in response to receiving the second typing input;
 determine a second attribute of the second capacitance measurement; and
 modify the stored attribute based at least in part on the second attribute.

18. A method for determining an input type on a capacitance module, comprising:
 receiving a typing input;
 taking a capacitance measurement in response to receiving the typing input;
 storing an attribute associated with the capacitance measurement; and
 determining an input type of a subsequent user input over the set of electrodes based, at least in part, on the stored attribute;
wherein the input type is a palm input.

19. A computer-program product for determining a user input on a capacitance module; the computer-program product comprising a non-transitory computer-readable medium storing instructions executable by a controller to:
 receive a typing input;
 take a capacitance measurement in response to receiving the typing input;
 store an attribute associated with the capacitance measurement; and
 determine an input type of a subsequent user input over the set of electrodes based, at least in part, on the stored attribute;
wherein the input type is a palm input.

* * * * *